United States Patent
King

(10) Patent No.: US 8,413,372 B2
(45) Date of Patent: Apr. 9, 2013

(54) PLANT WATERING SYSTEMS

(76) Inventor: Douglas A. King, Gilbert, AZ (US)

( * ) Notice: Subject to any disclaimer, the term of this patent is extended or adjusted under 35 U.S.C. 154(b) by 0 days.

(21) Appl. No.: 13/417,038

(22) Filed: Mar. 9, 2012

(65) Prior Publication Data

US 2012/0260568 A1    Oct. 18, 2012

Related U.S. Application Data

(63) Continuation-in-part of application No. 12/944,609, filed on Nov. 11, 2010, now Pat. No. 8,132,362, which is a continuation-in-part of application No. 11/766,644, filed on Jun. 21, 2007, now Pat. No. 8,065,832.

(60) Provisional application No. 60/805,580, filed on Jun. 22, 2006, provisional application No. 61/264,574, filed on Nov. 25, 2009.

(51) Int. Cl.
*A01G 29/00* (2006.01)

(52) U.S. Cl. ............................................. 47/48.5; 47/79

(58) Field of Classification Search ................... 47/48.5, 47/57.5, 79, 80; 111/7.1, 7.2; 43/131; D8/1; 239/276, 273, 271
See application file for complete search history.

(56) References Cited

U.S. PATENT DOCUMENTS

| | | | |
|---|---|---|---|
| 845,953 A | 3/1907 | Hitchcock |
| 2,214,083 A | 1/1939 | Lester |
| 2,791,347 A | 11/1954 | Boehm |
| 2,875,713 A | 1/1955 | Shoffner |
| 2,776,634 A | 1/1957 | Morton |
| 2,850,992 A | 9/1958 | Hooper et al. |
| 3,447,263 A | 6/1969 | Johnson |
| 3,659,536 A | 5/1972 | White |
| 3,783,804 A | 1/1974 | Platz |
| 4,158,269 A | 6/1979 | Williams et al. |
| 4,207,705 A | 6/1980 | Errede et al. |
| 4,453,343 A | 6/1984 | Grimes, Sr. |
| 4,745,706 A | 5/1988 | Muza et al. |
| 4,999,944 A | 3/1991 | Troy, III et al. |
| 5,172,515 A | 12/1992 | Lapshansky, Sr. et al. |
| 5,212,904 A | 5/1993 | Green et al. |
| 5,279,073 A | 1/1994 | Czebieniak |
| 5,533,300 A | 7/1996 | Kesler |
| 5,605,010 A | 2/1997 | Furlong et al. |
| 5,618,000 A | 4/1997 | Lantzy et al. |
| D389,705 S | 1/1998 | Puett |
| 5,761,846 A | 6/1998 | Marz |
| 5,836,106 A | 11/1998 | Alex |
| 5,901,497 A | 5/1999 | Bulvin |
| 5,918,412 A | 7/1999 | Shen |
| 5,924,240 A | 7/1999 | Harrison |
| 5,996,279 A | 12/1999 | Zayeratabat |
| D424,894 S | 5/2000 | Pottmeyer |
| 6,128,856 A | 10/2000 | Doan |

(Continued)

FOREIGN PATENT DOCUMENTS

| | | |
|---|---|---|
| AU | 2005100386 A4 | 10/2005 |
| JP | 3153088 U9 | 8/2009 |
| KR | 10-0888887 B1 | 3/2009 |

*Primary Examiner* — T. Nguyen

(74) *Attorney, Agent, or Firm* — Stoneman Law Patent Group; Martin L. Stoneman

(57) ABSTRACT

A system for dispersing water to the root zone of one or more plants beneath the soil's surface, comprising a perforated hollow cylindrical tube, ending in a spike, with an internal filter, which is driven into the ground to deliver water to the root zone of a plant or plants is disclosed.

20 Claims, 10 Drawing Sheets

U.S. PATENT DOCUMENTS

| | | |
|---|---|---|
| 6,138,408 A | 10/2000 | Paternoster et al. |
| 6,241,163 B1 | 6/2001 | Bremer |
| 6,243,986 B1 | 6/2001 | Crowley |
| 6,443,367 B1 | 9/2002 | Bova |
| 6,540,436 B2 | 4/2003 | Ogi |
| 6,598,338 B2 | 7/2003 | Buss et al. |
| 2004/0037647 A1 | 2/2004 | Yonat et al. |
| 2005/0000154 A1 | 1/2005 | Perriello et al. |
| 2005/0163569 A1 | 7/2005 | Allen |
| 2005/0279264 A1 | 12/2005 | Collins |
| 2006/0053690 A1 | 3/2006 | Zayeratabat |
| 2009/0031626 A1 | 2/2009 | Peterson |

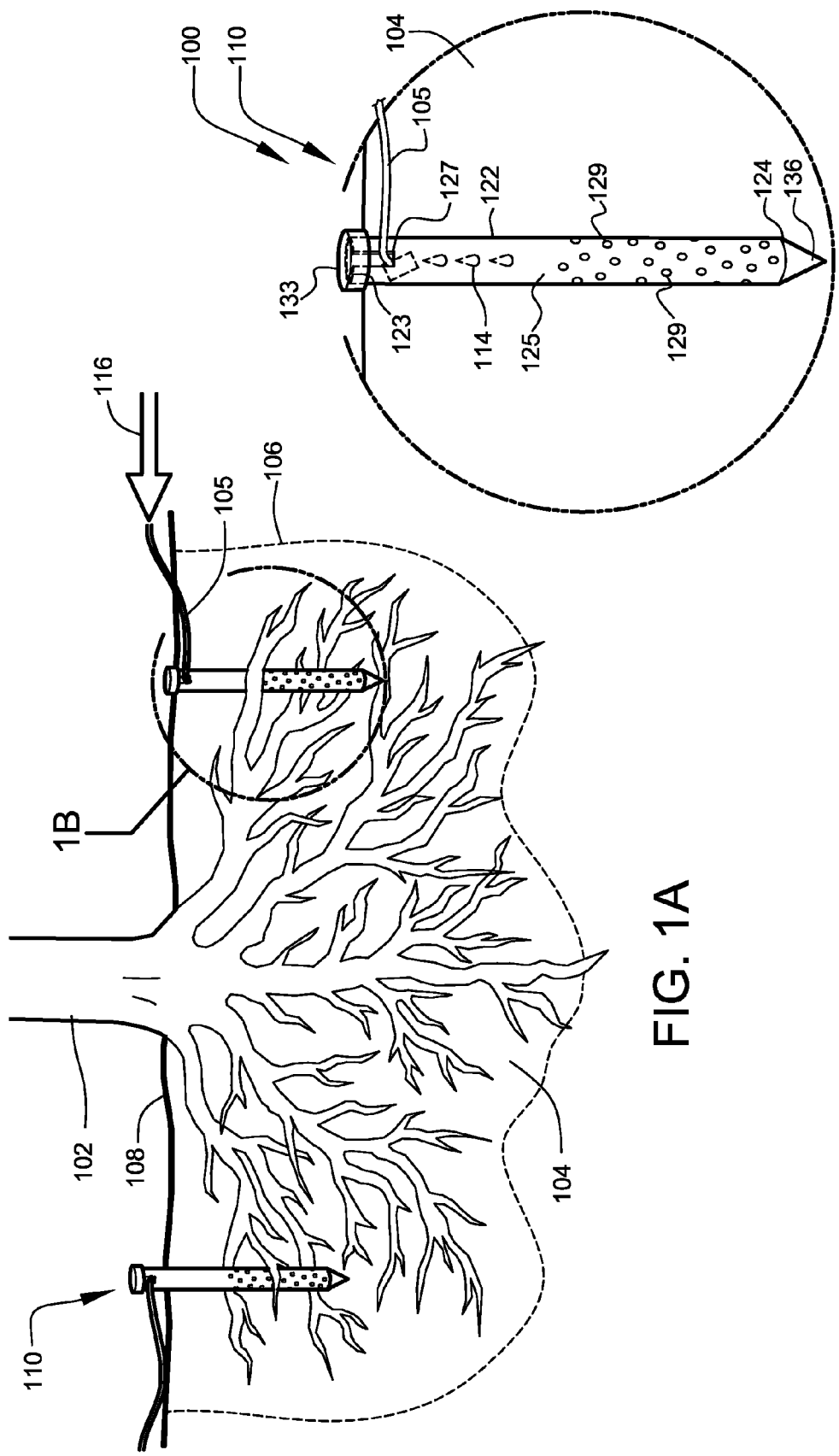

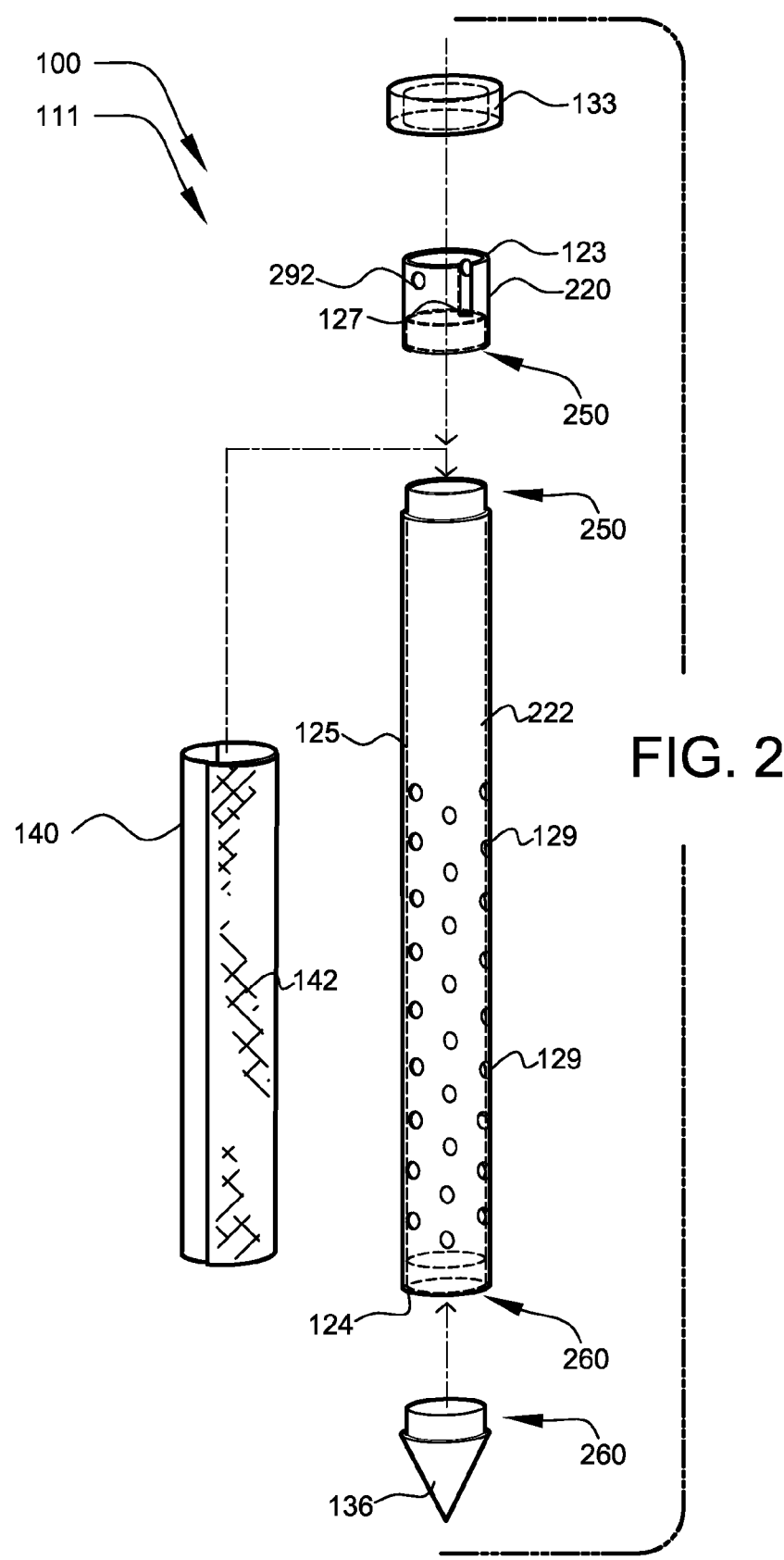

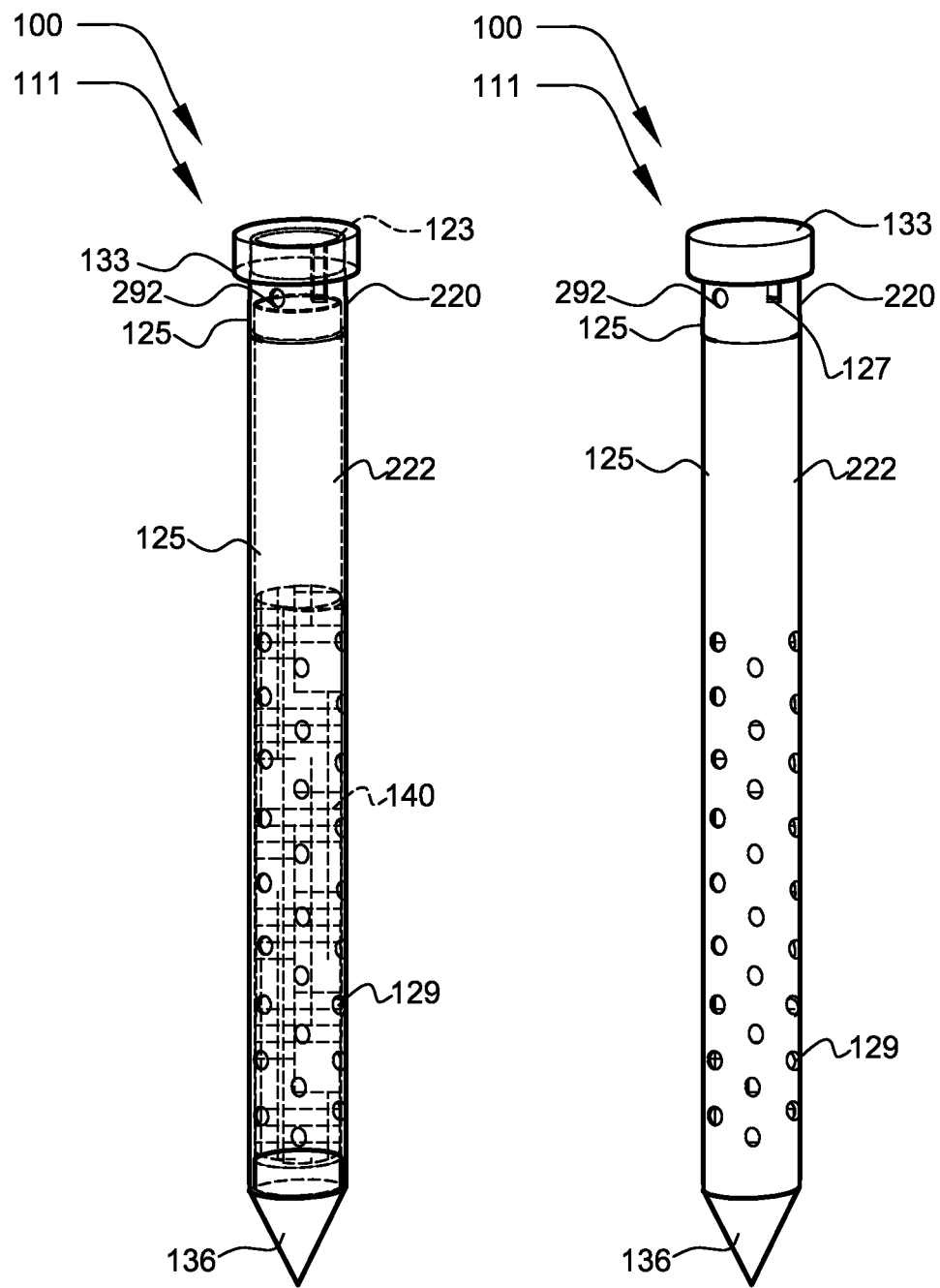

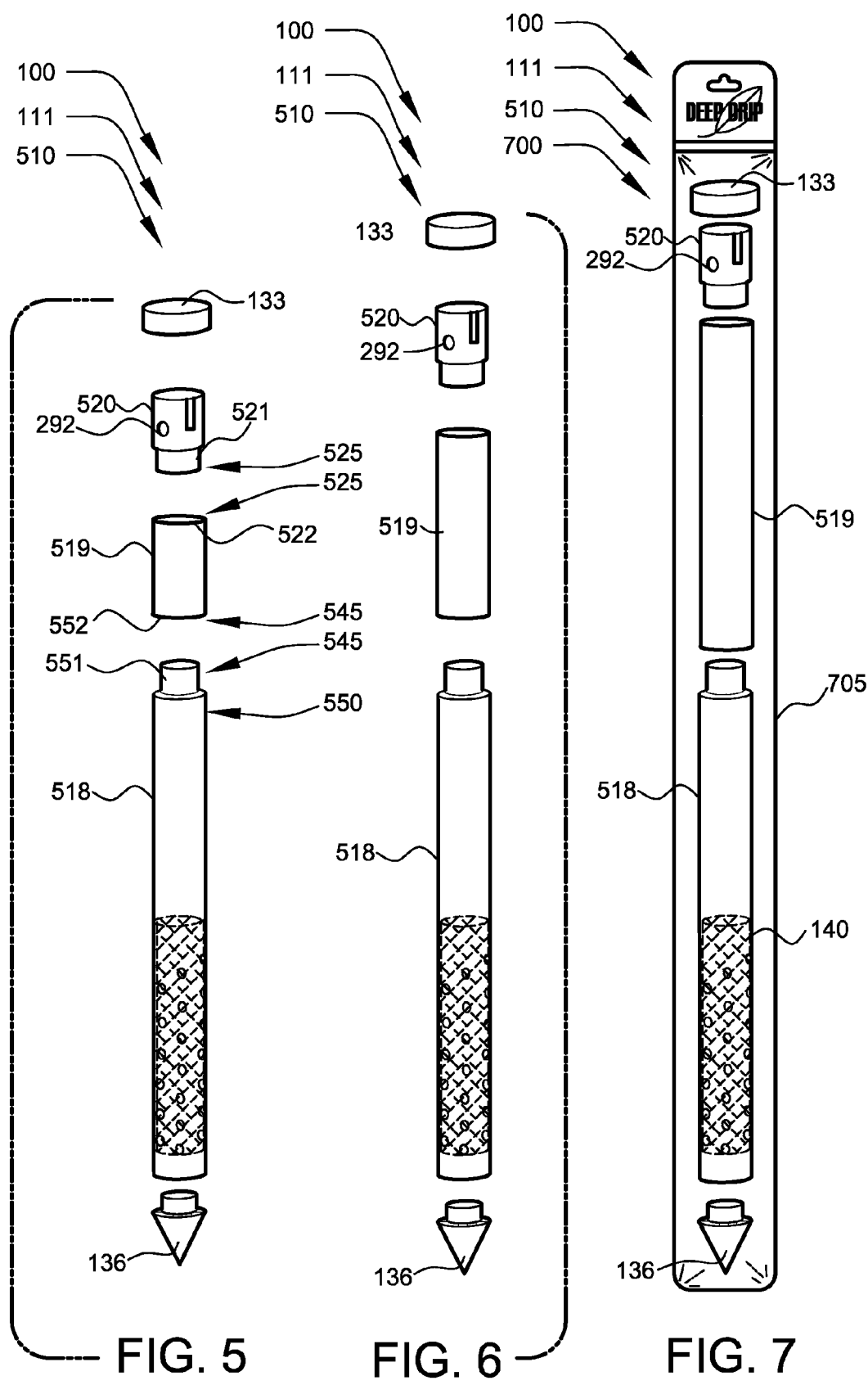

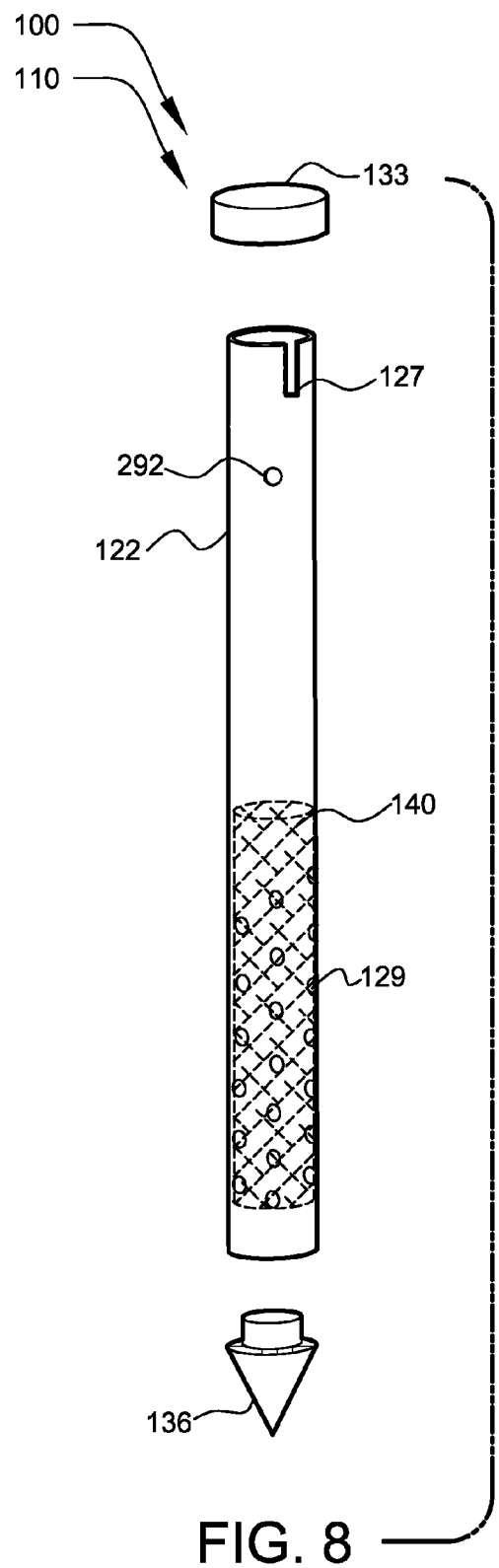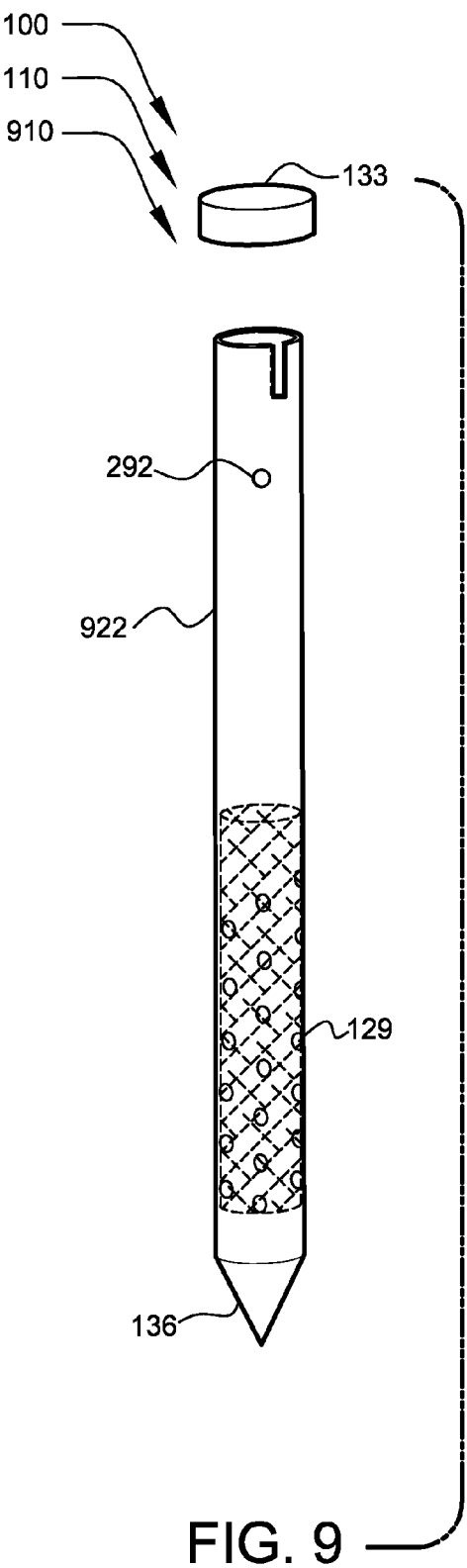

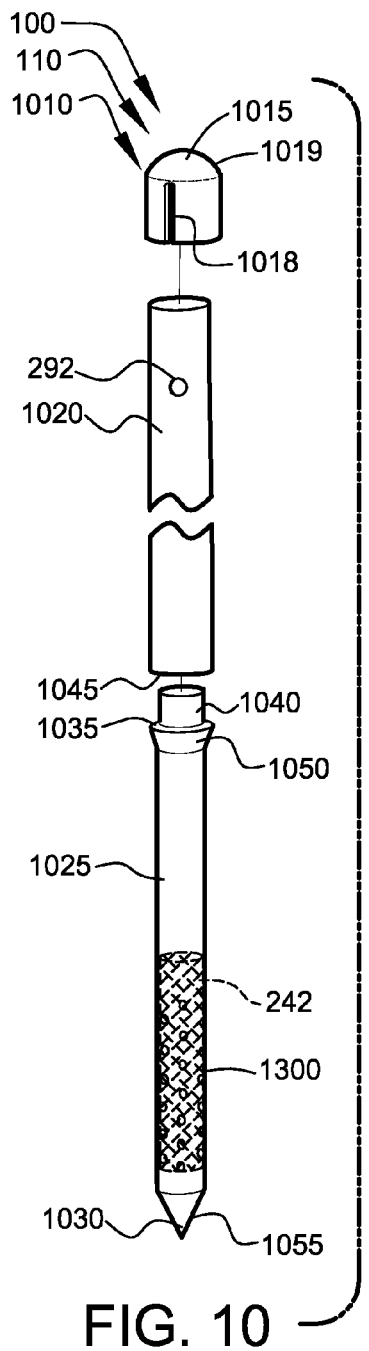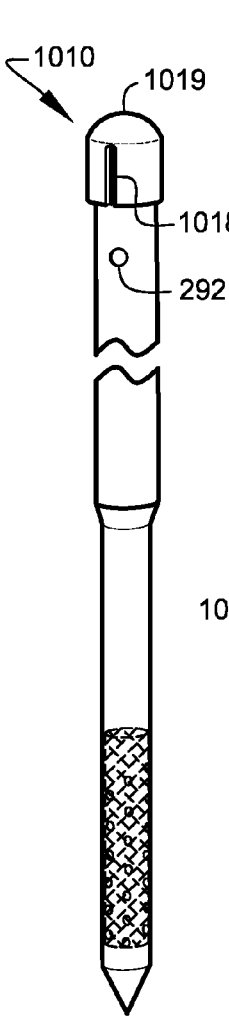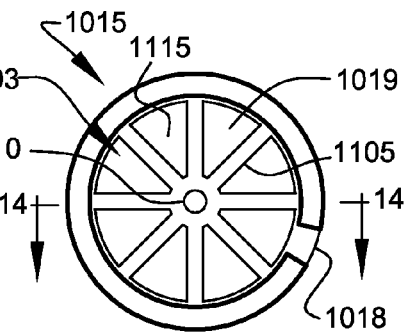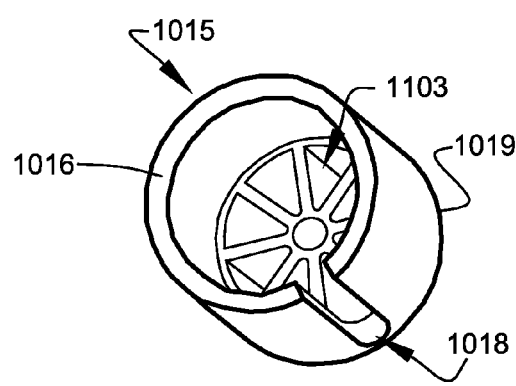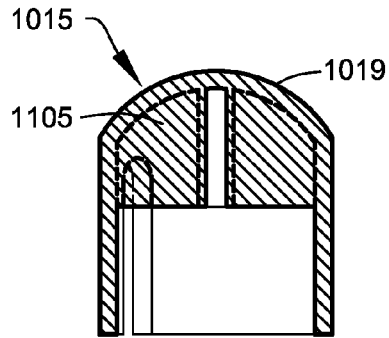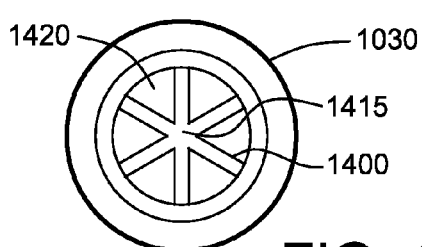
FIG. 10
FIG. 11
FIG. 12
FIG. 13
FIG. 14
FIG. 15
FIG. 16

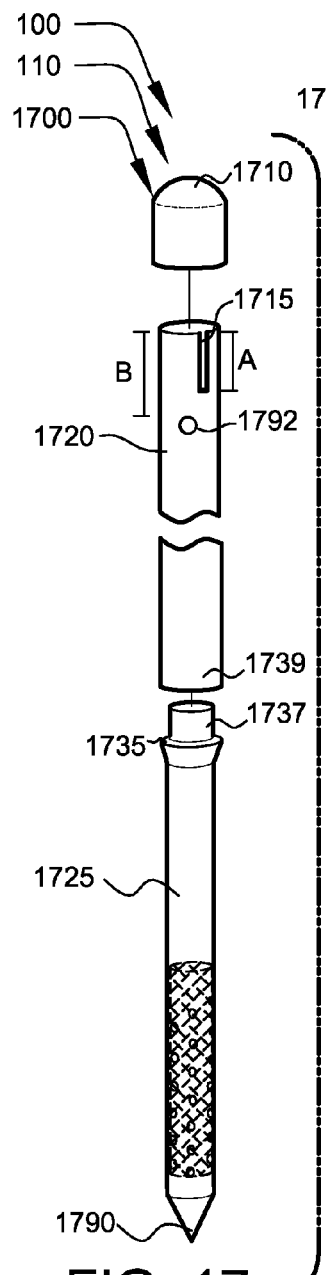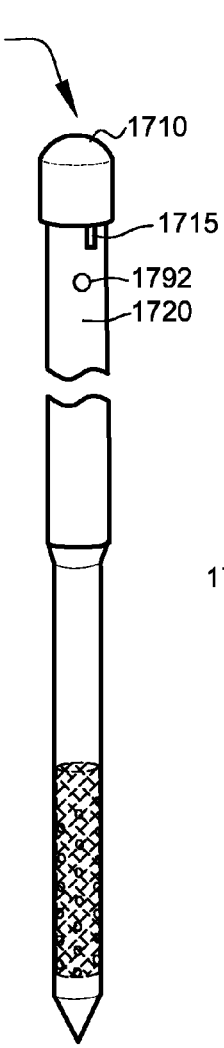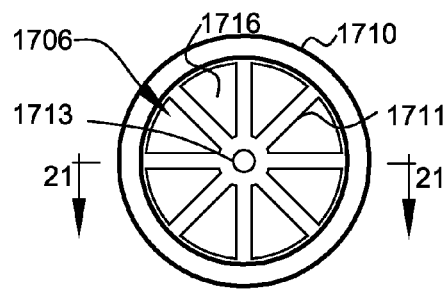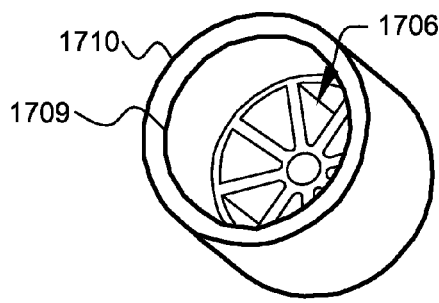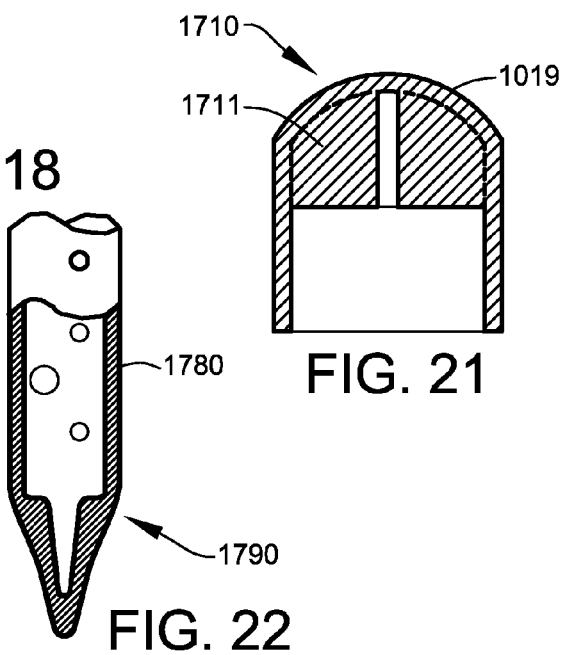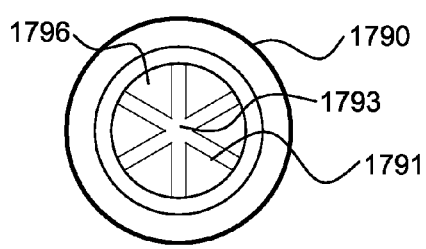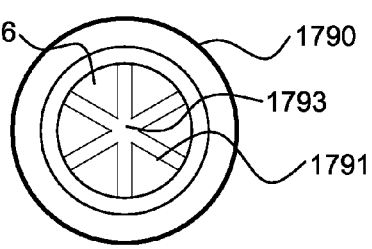

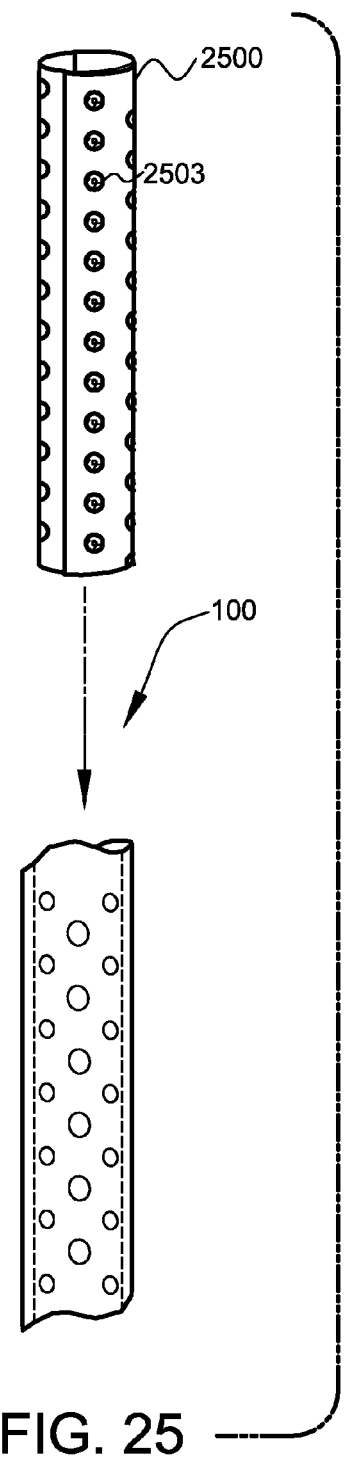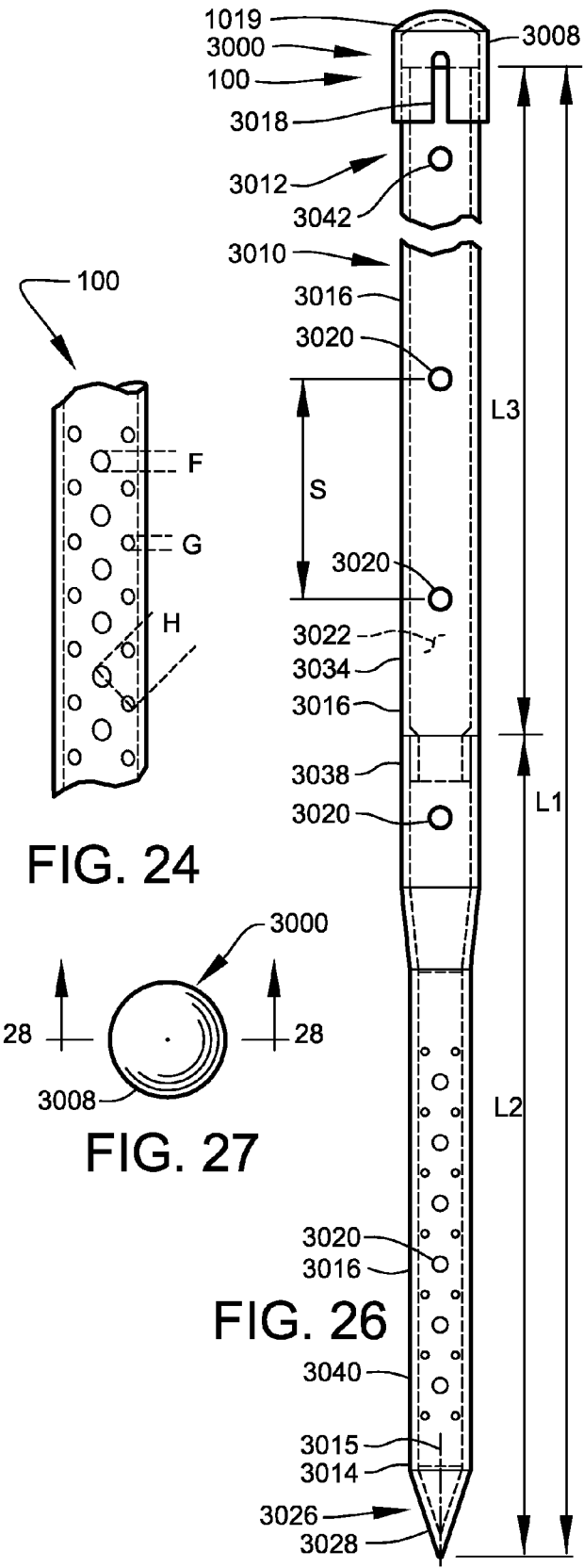
FIG. 24
FIG. 27
FIG. 25
FIG. 26

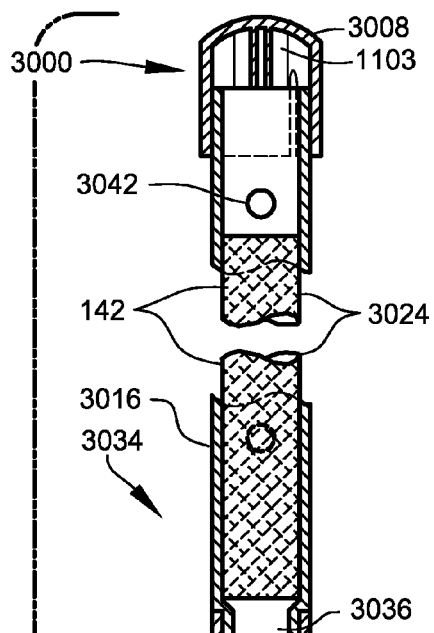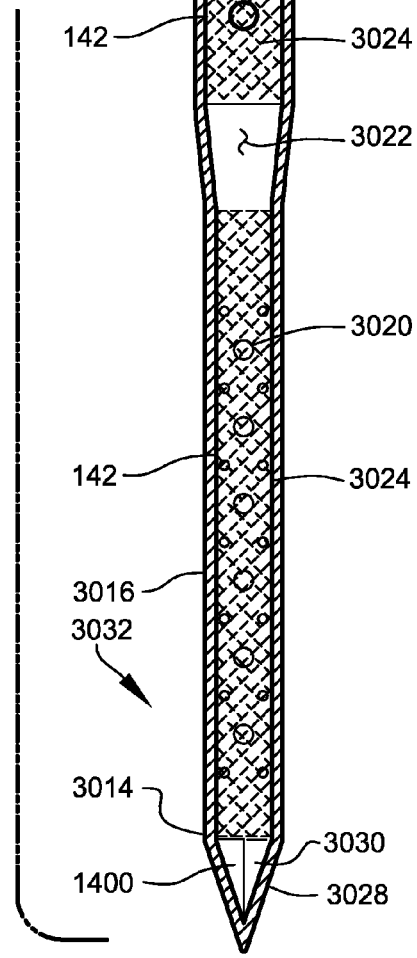
FIG. 28
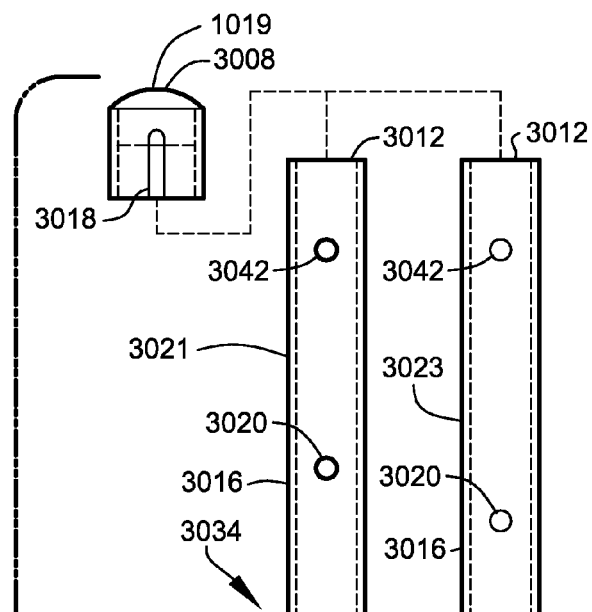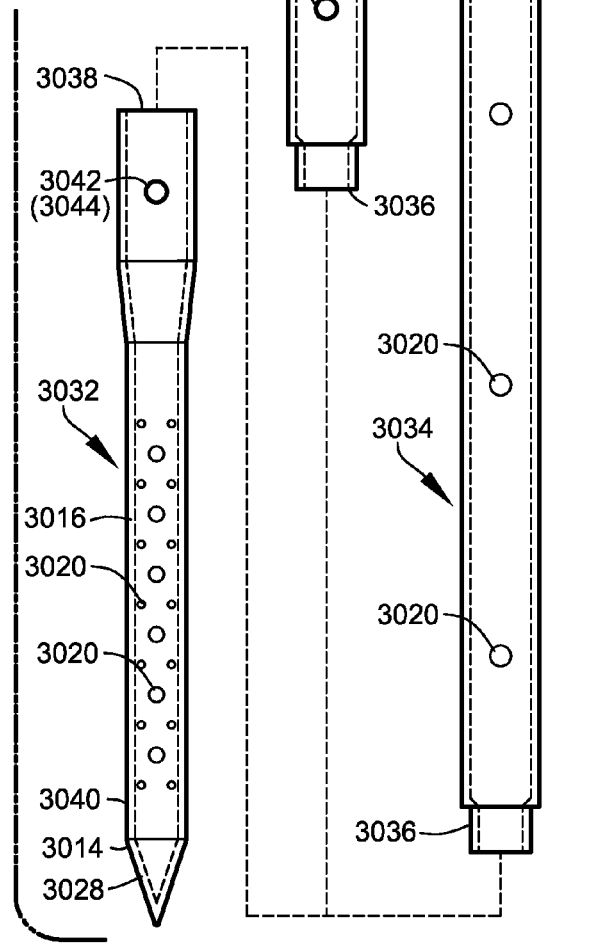
FIG. 29

PLANT WATERING SYSTEMS

CROSS-REFERENCE TO RELATED APPLICATIONS

The present application is a continuation-in-part of, and is related to and claims priority from, application Ser. No. 12/944,609, filed Nov. 11, 2010, entitled "PLANT WATERING SYSTEMS"; which application is a continuation-in-part of patent application Ser. No. 11/766,644, filed Jun. 21, 2007, entitled "TREE WATERING SYSTEMS", now issued U.S. Pat. No. 8,065,832 issued Nov. 29, 2011, which is related to and claims priority from prior provisional application Ser. No. 60/805,580, filed Jun. 22, 2006, entitled "TREE WATERING SYSTEMS"; and application Ser. No. 12/944,609 is related to and claims priority from prior provisional application Ser. No. 61/264,574, filed Nov. 25, 2009, entitled "PLANT WATERING SYSTEMS"; the contents of all of which are incorporated herein by this reference and are not admitted to be prior art with respect to the present invention by the mention in this cross-reference section.

BACKGROUND

The present invention relates to plant watering systems. More particularly, the present invention relates to plant watering systems structured and arranged to deliver water directly to the root zone of a tree or shrub. Further, the present invention relates to plant watering systems structured and arranged to be driven into the ground with a hammer, sledgehammer, or similar impact force provider.

Deep root watering has been shown to save water and encourage plants to develop strong, active root systems. In conventional deep-root watering, plants are watered less frequently, but the water is applied for a longer duration. This customary watering method has several limitations, including, the limited and often inconsistent delivery of water to the roots of the plant. In many cases, hard or compacted soil significantly restricts adequate moisture penetration. This effect is often magnified in larger trees and shrubs. Therefore, a need exists for a tree watering system that can assist in more efficiently promoting deep root watering of plants.

OBJECTS AND FEATURES OF THE INVENTION

A primary object and feature of the present invention is to provide a tree watering system.

It is a further object and feature of the present invention to provide such a system capable of being driven into hard soil with the use of a hammer, sledgehammer, or related impact force providing device, without cracking, bending, or causing structural failure to such system. It is another object and feature of the present invention to provide such a system having modular lengths. It is yet another object and feature of the present invention to provide such a system structured and arranged to prevent dirt from entering the system. Still another object and feature of the present invention is to provide such a system that further comprises an herbicide to control the growth of the roots of a tree.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a plant watering system, relating to dispersing at least one aqueous liquid, from at least one aqueous liquid source, into soil comprising a root zone of a plant situate beneath a surface of the soil, such plant watering system comprising: at least one cylindrical tube structured and arranged to permit the flow of the at least one aqueous liquid from the at least one aqueous liquid source to the root zone of the plant comprising at least one top end portion, at least one bottom end portion, and at least one sidewall extending therebetween; located within such at least one sidewall a plurality of passages, each one structured and arranged to pass the at least one aqueous liquid from within such at least one cylindrical tube through such at least one sidewall, and at least one material excluder structured and arranged to exclude non-liquid material from passing through such plurality of passages; and wherein such at least one top end portion is structured and arranged to receive the at least one aqueous liquid from the at least one aqueous liquid source into such at least one cylindrical tube; wherein such plurality of passages are structured and arranged to disperse the at least one aqueous liquid along substantially a full length of such at least one cylindrical tube extending between such at least one top end portion and such at least one bottom end portion; and wherein such at least one bottom end portion comprises at least one soil-penetration assister structured and arranged to assist penetration of such at least one cylindrical tube through the soil; and at least one structurally reinforced cap structured and arranged to cap such at least one cylindrical tube; wherein such at least one structurally reinforced cap comprising at least one upper outer surface, at least one upper inner surface, and at least one first structural reinforcer structured and arranged to reinforce such at least one structurally reinforced cap against structural failure during at least one longitudinally applied impact force sufficient to effectuate penetration into the soil; wherein such at least one first structural reinforce comprises at least one domed-shaped force distributor structured and arranged to distribute at least one longitudinally applied impact force, applied to such at least one upper outer surface, to at least one cap sidewall; and wherein, when such at least one structurally reinforced cap is coupled onto such at least one cylindrical tube, such at least one domed-shaped force distributor assists force distribution of such at least one longitudinally applied impact force to such at least one top end portion and to such at least one sidewall of such at least one cylindrical tube to effectuate penetration of such at least one cylindrical tube through the soil.

Moreover, it provides such a plant watering system wherein such at least one upper outer surface, such at least one upper inner surface, and such at least one first structural reinforcer of such at least one structurally reinforced cap comprise at least one combined thickness in excess of about one-half inch. Additionally, it provides such a plant watering system wherein such at least one first structural reinforcer comprises at least one structural web framework. Also, it provides such a plant watering system wherein such at least one at least one structural web framework comprises at least eight struts arranged around a central axis in equidistant arrangement. In addition, it provides such a plant watering system wherein such at least one structurally reinforced cap comprises ultra-violet (UV) stabilizers structured and arranged to resist material decomposition due to ultra-violet radiation. And, it provides such a plant watering system wherein: such at least one domed-shaped force distributor comprises a domed-shaped top about one and three-quarter inch in height, and one and one-half inch in outer diameter; and such at least one structural web framework extends downwardly about one-inch from such at least one upper inner surface of such at least one structurally reinforced cap. Further, it provides such a plant watering system wherein at least one soil-penetration assister comprises a spike. Even further, it provides such a plant watering system wherein such spike comprises at least one second structural reinforcer structured and arranged to reinforce such spike, against structural failure of such spike, during such penetration of such at least one cylindrical tube through the soil. Moreover, it provides such a plant watering system wherein such second structural reinforcer comprises at least six struts arranged around a central axis in equidistant arrangement. Additionally, it provides such a plant watering system wherein such at least one material excluder comprises at least one liquid-permeable fabric overlaying and situate adjacent an inner-wall surface of such at least one sidewall. Also, it provides such a plant watering system wherein such at least one structurally reinforced cap comprises at least one side slot structured and arranged to receive at least one liquid-carrying tube providing tube-assisted carrying of the at least one aqueous liquid from the at least one aqueous liquid source.

In addition, it provides such a plant watering system wherein such at least one cylindrical tube further comprises: at least one first tube segment comprising at least one first tube-segment length; at least one second tube segment comprising at least one second tube-segment length and at least one second segment sidewall; and at least one coupler structured and arranged to couple such at least one first tube segment with such at least one second tube segment; wherein such at least one first tube segment comprises such at least one bottom end portion; and wherein such at least one second tube segment comprises such at least one top end portion. And, it provides such a plant watering system wherein such at least one first tube-segment length comprises at least about 12 inches. Further, it provides such a plant watering system wherein such at least one second tube-segment length comprises a plurality of segment lengths to assist user selecting of a penetration depth of such at least one cylindrical tube beneath the surface of such soil. Even further, it provides such a plant watering system wherein both such at least one first tube-segment and such at least one second-tube segment are structured and arranged to removably receive such at least one structurally reinforced cap. Even further, it provides such a plant watering system wherein such plurality of passages comprises: extending along such at least one first tube-segment length, at least one regular pattern of apertures having an aggregate open area of at least about one quarter of one square inch, extending along such at least one second tube-segment length, at least one linear pattern of apertures each one comprising a diameter of about three-eighths inch and an aperture to aperture spacing of about four inches; The plant watering system wherein: such at least one second segment sidewall of such at least one second tube segment comprises at least one tool-receiving aperture structured and arrange to receive at least one hand-grippable tool; and such at least one tool-receiving aperture is structured and arranged to assist user removal of such at least one cylindrical tube, from the soil, using such at least one hand-grippable tool. Even further, it provides such a plant watering system wherein: such at least one second tube segment comprises an inner diameter of about one inch and a sidewall thickness of about $5/32$ inch; and such at least one first tube segment comprises a proximal end having an inner diameter of about one inch and a sidewall thickness of about $5/32$ inch, and a distal end having an outer diameter of about one inch and a sidewall thickness of about $5/32$ inch.

In accordance with another preferred embodiment hereof, this invention provides a plant watering system, relating to dispersing at least one aqueous liquid, from at least one aqueous liquid source, into soil comprising a root zone of a plant situate beneath a surface of the soil, such plant watering system comprising: at least one cylindrical tube structured and arranged to permit the flow of the at least one aqueous liquid from the at least one aqueous liquid source to the root zone of the plant comprising at least one top end portion, at least one bottom end portion, and at least one sidewall extending therebetween; located within such at least one sidewall a plurality of passages, each one structured and arranged to pass the at least one aqueous liquid from within such at least one cylindrical tube through such at least one sidewall, and at least one material excluder structured and arranged to exclude non-liquid material from passing through such plurality of passages; wherein such at least one top end portion is structured and arranged to receive the at least one aqueous liquid from the at least one aqueous liquid source into such at least one cylindrical tube; and wherein such plurality of passages are structured and arranged to disperse the at least one aqueous liquid along substantially a full length of such at least one cylindrical tube extending between such at least one top end portion and such at least one bottom end portion; wherein such at least one bottom end portion comprises at least one soil-penetration assister structured and arranged to assist penetration of such at least one cylindrical tube through the soil; and at least one structurally reinforced cap structured and arranged to cap such at least one cylindrical tube; wherein such at least one structurally reinforced cap comprises at least one structural reinforcer structured and arranged to reinforce such at least one structurally reinforced cap against structural failure during at least one longitudinally applied impact force sufficient to effectuate penetration into the soil; wherein such at least one structural reinforcer comprises at least one force distributor structured and arranged to distribute such at least one longitudinally applied impact force, applied to such at least one structurally reinforced cap, to at least one cap sidewall, at least one splaying resistor structured and arranged to resist splaying, due to such at least one longitudinally applied impact force, of such at least one cap sidewall, and wherein such at least one structurally reinforced cap comprises at least one force transferor structured and arranged to transfer such at least one downwardly applied impact force to such at least one top end portion and to such at least one sidewall of such at least one cylindrical tube, when such at least one structurally reinforced cap is coupled onto such at least one cylindrical tube.

Even further, it provides such a plant watering system wherein such at least one structurally reinforced cap comprises at least one side slot structured and arranged to receive at least one liquid-carrying tube providing tube-assisted carrying of the at least one aqueous liquid from the at least one aqueous liquid source.

In accordance with another preferred embodiment hereof, this invention provides a plant watering system, relating to dispersing at least one aqueous liquid, from at least one aqueous liquid source, into soil comprising a root zone of a plant situate beneath a surface of such soil, such plant watering system comprising: at least one cylindrical tube structured and arranged to permit the flow of the at least one aqueous liquid from the at least one aqueous liquid source to the root zone of the plant comprising at least one top end portion, at least one bottom end portion, and at least one sidewall extending therebetween; located within such at least one sidewall a plurality of passages, each one structured and arranged to pass the at least one aqueous liquid from within such at least one cylindrical tube through such at least one sidewall, and at least one material excluder structured and arranged to exclude non-liquid material from passing through such plurality of passages; and at least one cap structured and arranged to cap such at such at least one top end portion of such at least one cylindrical tube; wherein such at least one cap comprises at least one first structural reinforcer structured and arranged to reinforce such at least one cap, against structural failure of such at least one cap, during impact by a hammer used to effect such penetration of such at least one cylindrical tube through the soil; wherein such at least one top end portion is structured and arranged to receive the at least one aqueous liquid from the at least one aqueous liquid source into such at least one cylindrical tube; wherein such at least one bottom end portion comprises at least one soil-penetration assister structured and arranged to assist penetration of such at least one cylindrical tube through the soil; and wherein such plurality of passages are structured and arranged to disperse the at least one aqueous liquid along substantially a full length of such at least one cylindrical tube extending between such at least one top end portion and such at least one bottom end portion. Moreover, it provides such a plant watering system wherein at least one soil-penetration assister comprises a spike tapering from such at least one bottom end portion to exactly one closed conical point; wherein such spike comprises at least one second structural reinforcer structured and arranged to reinforce such spike, against structural failure of such spike, during such penetration of such at least one cylindrical tube through the soil.

Additionally, it provides such a plant watering system wherein such at least one cylindrical tube further comprises: at least one first tube segment comprising at least one first tube-segment length; at least one second tube segment comprising at least one second tube-segment length; and at least one coupler structured and arranged to couple such at least one first tube segment with such at least one second tube segment; wherein such at least one first tube segment comprises such at least one bottom end portion; and wherein such at least one second tube segment comprises such at least one top end portion. Also, it provides such a plant watering system wherein such at least one first tube-segment length comprises at least about 12 inches. In addition, it provides such a plant watering system wherein such at least one second tube-segment length comprises a plurality of segment lengths to assist user selecting of a penetration depth of such at least one cylindrical tube beneath the surface of such soil.

And, it provides such a plant watering system wherein such at least one second tube-segment length comprises about 11 inches. Further, it provides such a plant watering system wherein such at least one second tube-segment length comprises about 22 inches. Even further, it provides such a plant watering system wherein both such at least one first tube segment and such at least one second tube segment are structured and arranged to removably receive such at least one cap. Moreover, it provides such a plant watering system wherein such plurality of passages comprises: extending along such at least one first tube-segment length, at least one regular pattern of apertures having an aggregate open area of at least about one quarter of one square inch; extending along such at least one second tube-segment length, at least one linear pattern of apertures each one comprising a diameter of about 3/8 inch and an aperture to aperture spacing of about four inches; wherein at least one. Additionally, it provides such a plant watering system wherein such at least one cap comprises at least one side slot structured and arranged to receive at least one liquid-carrying tube providing tube-assisted carrying of the at least one aqueous liquid from the at least one aqueous liquid source.

Also, it provides such a plant watering system wherein such at least one sidewall of such at least one second tube segment comprises at least one tool-receiving aperture structured and arrange to receive at least one hand-grippable tool; wherein such at least one tool-receiving aperture is structured and arranged to assist user removal of such at least one cylindrical tube, from the soil, using such at least one hand-grippable tool. In addition, it provides such a plant watering system wherein: such at least one cylindrical tube comprises only such at least one first tube segment; such at least one cap is coupled with such at least one first tube segment; and such at least one first tube segment comprises at least one tool-receiving aperture structured and arrange to receive at least one hand-grippable tool; wherein such at least one tool-receiving aperture is structured and arranged to assist user removal of such at least one cylindrical tube, from the soil, using such at least one hand-grippable tool. And, it provides such a plant watering system wherein: such at least one second tube segment comprises an inner diameter of about one inch and a sidewall thickness of about 5/32 inch; and such at least one first tube segment comprises a proximal end having an inner diameter of about one inch and a sidewall thickness of about 5/32 inch, and a distal end having an outer diameter of about one inch and a sidewall thickness of about 5/32 inch.

Further, it provides such a plant watering system wherein such at least one material excluder comprises at least one liquid-permeable fabric overlaying and situate adjacent an inner-wall surface of such at least one sidewall. Even further, it provides such a plant watering system further comprising at least one herbicide to control growth of nearby roots. Moreover, it provides such a plant watering system wherein such at least one cylindrical tube substantially comprises rigid Acrylonitrile Butadiene Styrene (ABS) plastic.

In accordance with another preferred embodiment hereof, this invention provides a plant watering system, relating to dispersing at least water, from an at least water source, into soil, beneath a surface of such soil, to a root zone of a plant, such plant watering system comprising: at least one first cylindrical tube structured and arranged to permit the flow of at least water from the at least water source to the root zone of a plant comprising at least one first top end, at least one first bottom end, and at least one first sidewall; at least one second cylindrical tube structured and arranged to permit the flow of at least water from the at least water source to the root zone of a plant comprising at least one second top end, at least one second bottom end, and at least one second sidewall; wherein such at least one first cylindrical tube and such at least one second cylindrical tube are each structured and arranged to receive at least water from the at least water source; wherein such at least one second cylindrical tube is structured and arranged to disperse at least water through such at least one second sidewall of such at least one second cylindrical tube; wherein depth placement beneath the soil of such at least one cylindrical tube is selectable by selection of a particular second cylindrical tube having a particular length; at least one structurally reinforced cap structured and arranged to cap such at least one first top end and structured and arranged to withstand driving impact forces applied to such plant watering system to drive such plant watering system into the soil; at least one spike connected to such at least one second bottom end of such at least one second cylindrical tube; wherein such at least one spike tapers to exactly one closed conical point; at least one excluder structured and arranged to exclude soil from such at least one plant watering system; wherein such at least one excluder is located inside such at least one second cylindrical tube and adjacent an internal wall of such at least one second cylindrical tube; wherein the length of such at least one second cylindrical tube is at least five times the outside radius of such at least one second cylindrical tube;

wherein such at least one first cylindrical tube is structured and arranged to removably connect to such at least one second cylindrical tube.

Additionally, it provides such a plant watering system wherein such at least one taper is removably attachable to such at least one second bottom end of such at least one second cylindrical tube. Also, it provides such a plant watering system wherein such at least one first sidewall comprises at least one slot adjacent such at least one first top end of such at least one first cylindrical tube to receive at least one water source tubing. In addition, it provides such a plant watering system wherein: such at least one first cylindrical tube comprises at least one hole structured and arranged to assist removal of such at least one first cylindrical tube from the soil; and such at least one remover comprises at least one hole in such at least one first sidewall structured and arranged to be accessible from adjacent the soil surface in use. And, it provides such a plant watering system wherein such at least one excluder comprises at least one fabric. Further, it provides such a plant watering system wherein such at least one first cylindrical tube and such at least one second cylindrical tube are about eighteen inches long when connected together. Even further, it provides such a plant watering system wherein such at least one first cylindrical tube and such at least one second cylindrical tube are about twenty-four inches long when connected together.

Moreover, it provides such a plant watering system wherein such at least one first cylindrical tube and such at least one second cylindrical tube are about thirty-six inches long when connected together. Additionally, it provides such a plant watering system further comprising at least one herbicide to control growth of nearby roots. Also, it provides such a plant watering system wherein such at least one cylindrical tube comprises a plurality of perforations structured and arranged to assist dispersal of at least water from such at least one cylindrical tube.

In accordance with another preferred embodiment hereof, this invention provides a plant watering system, relating to dispersing at least water, from an at least water source, into soil, beneath a surface of such soil, to a root zone of a plant, such plant watering system comprising: at least two cylindrical tubes structured and arranged to permit the flow of at least water from the at least water source to the root zone of a plant; wherein a first cylindrical tube of such at least two cylindrical tubes comprises at least one first top end, at least one first male connector, at least one first bottom end, and at least one first sidewall; wherein a second cylindrical tube of such at least two cylindrical tubes comprises at least one second top end, wherein such at least one second top end is structured and arranged to receive such at least one first male connector, at least one second bottom end, and at least one second sidewall, wherein such second cylindrical tube is a particular selectable length; at least one spike connected to such at least one second bottom end; wherein such at least one spike tapers to exactly one closed conical point; wherein such at least two cylindrical tubes are each structured and arranged to receive at least water from the at least water source; wherein such at least one second cylindrical tube is structured and arranged to disperse at least water through such at least one second sidewall of such at least one second cylindrical tube by way of a plurality of perforations in such at least one second sidewall; wherein depth placement beneath the soil of such at least one second cylindrical tube is selectable by selection of a particular second cylindrical tube having a particular length; at least one structurally reinforced cap structured and arranged to cap such at least one first top end and structured and arranged to withstand driving impact forces applied to such plant watering system to drive such plant watering system into the soil; at least one excluder structured and arranged to exclude soil from such at least one plant watering system; wherein such at least one excluder is located inside such at least one second cylindrical tube and adjacent an internal wall of such at least one second cylindrical tube; and wherein the length of such at least one second cylindrical tube is at least five times the outside radius of such at least one second cylindrical tube. In addition, it provides such a plant watering system further comprising: at least one third cylindrical tube comprising at least one third top end, wherein such at least one top end comprises at least one second male connector structured and arranged to connect with such at least one second bottom end, at least one third bottom end, and at least one third sidewall.

In accordance with a preferred embodiment hereof, this invention provides a tree watering system, relating to dispersing at least water, from an at least water source, into soil, beneath a surface of such soil, to a root zone of a tree, such tree watering system comprising: at least one cylindrical tube structured and arranged to permit the flow of at least water from the at least water source to the root zone of a tree comprising at least one top end, at least one bottom end, and at least one sidewall; wherein such at least one cylindrical tube is structured and arranged to receive at least water from such at least water source into such at least one cylindrical tube; wherein such at least one cylindrical tube is structured and arranged to disperse at least water through such at least one sidewall of such at least one cylindrical tube; wherein depth placement beneath the soil of such at least one cylindrical tube is selectable; at least one cap structured and arranged to cap such at least one cylindrical tube at such at least one top end; wherein such at least one cap is structurally reinforced to permit pounding such tree watering system into soil without breaking such tree watering system with such at least one cap installed on such at least one top end; at least one spike connected to such at least one cylindrical tube at such at least one bottom end; wherein such at least one spike tapers from such at least one bottom end to exactly one closed conical point; at least one excluder structured and arranged to exclude soil from the interior of such at least one cylindrical tube; wherein such at least one excluder is located adjacent an internal wall of such at least one cylindrical tube. Moreover, it provides such a tree watering system wherein such at least one cylindrical tube comprises a plurality of modularly attachable cylindrical tubes of various sizes to select such depth placement. Additionally, it provides such a tree watering system wherein such at least one spike is removably attachable to such at least one bottom end of such at least one cylindrical tube. Also, it provides such a tree watering system wherein such at least one cylindrical tube comprises at least one slot in such at least one sidewall, adjacent such at least one top end of such at least one cylindrical tube, to receive at least one water source tubing. In addition, it provides such a tree watering system wherein such at least one sidewall comprises at least one hole; wherein such at least one hole is structured and arranged to assist removal of such at least one cylindrical tube from the soil, when installed; and wherein such at least one hole is structured and arranged to be accessible to a user when such at least one top end is substantially adjacent the soil surface. And, it provides such a tree watering system wherein such at least one excluder comprises at least one fabric. Further, it provides such a tree watering system wherein such at least one top end of such at least one cylindrical tube is structured and arranged to be positioned above the soil surface yet below the blades of a lawnmower. Even further, it provides such a tree watering system wherein such at least one top end of such at least one cylindrical tube is adapted to be positioned less than about one inch above the soil surface. Moreover, it provides such a tree watering system further comprising at least one herbicide to control growth of nearby roots. Additionally, it provides such a tree watering system wherein such at least one cylindrical tube comprises a plurality of perforations structured and arranged to assist dispersal of at least water from such at least one cylindrical tube.

In accordance with another preferred embodiment hereof, this invention provides a tree watering system, relating to dispersing at least water, from an at least water source, into soil, beneath a surface of such soil, to a root zone of a tree, such tree watering system comprising: at least one first cylindrical tube structured and arranged to permit the flow of at least water from the at least water source to the root zone of a tree comprising at least one first top end, at least one first bottom end, and at least one first sidewall; at least one second cylindrical tube structured and arranged to permit the flow of at least water from the at least water source to the root zone of a tree comprising at least one second top end, at least one second bottom end, and at least one second sidewall; wherein such at least one first cylindrical tube and such at least one second cylindrical tube are each structured and arranged to receive at least water from the at least water source; wherein such at least one second cylindrical tube is structured and arranged to disperse at least water through such at least one second sidewall of such at least one second cylindrical tube; wherein depth placement beneath the soil of such at least one cylindrical tube is selectable by selection of a particular second cylindrical tube having a particular length; at least one structurally reinforced cap structured and arranged to cap such at least one first top end and structured and arranged to withstand driving impact forces applied to such tree watering system to drive such tree watering system into the soil; at least one spike connected to such at least one second bottom end of such at least one second cylindrical tube; wherein such at least one spike tapers to exactly one closed conical point; at least one excluder structured and arranged to exclude soil from such at least one tree watering system; wherein such at least one excluder is located inside such at least one second cylindrical tube and adjacent an internal wall of such at least one second cylindrical tube; wherein the length of such at least one second cylindrical tube is at least five times the outside radius of such at least one second cylindrical tube; wherein such at least one first cylindrical tube is structured and arranged to removably connect to such at least one second cylindrical tube.

Also, it provides such a tree watering system wherein such at least one taper is removably attachable to such at least one second bottom end of such at least one second cylindrical tube. In addition, it provides such a tree watering system wherein such at least one first sidewall comprises at least one slot adjacent such at least one first top end of such at least one first cylindrical tube to receive at least one water source tubing. And, it provides such a tree watering system, wherein such at least one first cylindrical tube comprises at least one hole structured and arranged to assist removal of such at least one first cylindrical tube from the soil; and wherein such at least one remover comprises at least one hole in such at least one first sidewall structured and arranged to be accessible from adjacent the soil surface in use. Further, it provides such a tree watering system wherein such at least one excluder comprises at least one fabric. Even further, it provides such a tree watering system wherein such at least one first cylindrical tube and such at least one second cylindrical tube are about eighteen inches long when connected together. Moreover, it provides such a tree watering system wherein such at least one first cylindrical tube and such at least one second cylindrical tube are about twenty-four inches long when connected together. Additionally, it provides such a tree watering system wherein such at least one first cylindrical tube and such at least one second cylindrical tube are about thirty-six inches long when connected together. Also, it provides such a tree watering system further comprising at least one herbicide to control growth of nearby roots. In addition, it provides such a tree watering system wherein such at least one cylindrical tube comprises a plurality of perforations structured and arranged to assist dispersal of at least water from such at least one cylindrical tube.

In accordance with another preferred embodiment hereof, this invention provides a tree watering system, relating to dispersing at least water, from an at least water source, into soil, beneath a surface of such soil, to a root zone of a tree, such tree watering system comprising: at least three cylindrical tubes structured and arranged to permit the flow of at least water from the at least water source to the root zone of a tree; wherein a first cylindrical tube of such at least three cylindrical tubes comprises at least one first top end, at least one first male connector, at least one first bottom end, and at least one first sidewall; wherein a second cylindrical tube of such at least three cylindrical tubes comprises at least one second top end, wherein such at least one second top end is structured and arranged to receive such at least one first male connector, at least one second bottom end, and at least one second sidewall, wherein such second cylindrical tube is a particular selectable length; wherein a third cylindrical tube of such at least three cylindrical tubes comprises at least one third top end, wherein such at least one top end comprises at least one second male connector structured and arranged to connect with such at least one second bottom end, at least one third bottom end, and at least one third sidewall; at least one spike connected to such at least one third bottom end; wherein such at least one spike tapers to exactly one closed conical point; wherein such at least three cylindrical tubes are each structured and arranged to receive at least water from the at least water source; wherein such at least one third cylindrical tube is structured and arranged to disperse at least water through such at least one third sidewall of such at least one second cylindrical tube by way of a plurality of perforations in such at least one third sidewall; wherein depth placement beneath the soil of such at least one third cylindrical tube is selectable by selection of a particular second cylindrical tube having a particular length; at least one structurally reinforced cap structured and arranged to cap such at least one first top end and structured and arranged to withstand driving impact forces applied to such tree watering system to drive such tree watering system into the soil; at least one excluder structured and arranged to exclude soil from such at least one tree watering system; wherein such at least one excluder is located inside such at least one second cylindrical tube and adjacent an internal wall of such at least one second cylindrical tube; and wherein the length of such at least one second cylindrical tube is at least five times the outside radius of such at least one second cylindrical tube.

In accordance with a preferred embodiment hereof, this invention provides a tree watering system, relating to dispersing water into soil beneath such soil's surface, comprising: at least one cylindrical tube, comprising at least one top end, at least one bottom end, and at least one sidewall, structured and arranged to contain water; at least one receiver, structured and arranged to receive water into such at least one tube, adjacent such at least one top end of such at least one tube; at least one disperser structured and arranged to disperse water through such at least one sidewall of such at least one tube; at least one depth adjuster structured and arranged to adjust the depth of such at least one disperser beneath the soil surface; at least one reinforcer structured and arranged to reinforce such at least one top end of such at least one tube against driving impact forces; at least one taper structured and arranged to taper such at least one bottom end of such at least one tube into exactly one closed conical point; at least one excluder structured and arranged to exclude soil from such at least one tube; wherein such at least one excluder is located inside such at least one tube and adjacent such at least one disperser; wherein the length of such at least one cylindrical tube is at least five times the outside radius of such at least one cylindrical tube.

Moreover, it provides such a tree watering system, wherein such at least one cylindrical tube comprises a plurality of modularly attachable cylindrical tubes. Additionally, it provides such a tree watering system, wherein such at least one taper is removably attachable to such at least one bottom end of such at least one cylindrical tube. Also, it provides such a tree watering system, wherein such at least one reinforcer comprises at least one cap structured and arranged to cap such at least one top end of such at least one cylindrical tube. In addition, it provides such a tree watering system, wherein such at least one receiver comprises such at least one top end of such at least one cylindrical tube. And, it provides such a tree watering system, wherein such at least one receiver comprises at least one slot through such at least one sidewall adjacent such at least one top end of such at least one cylindrical tube. Further, it provides such a tree watering system, wherein such at least one cylindrical tube comprises at least one remover structured and arranged to assist removal of such at least one cylindrical tube from the soil.

Even further, it provides such a tree watering system, wherein such at least one remover comprises at least one hole in such at least one sidewall structured and arranged to be accessible from adjacent the soil surface in use. Moreover, it provides such a tree watering system, wherein such at least one excluder comprises at least one fabric. Additionally, it provides such a tree watering system, wherein such at least one excluder comprises at least one landscape fabric. Also, it provides such a tree watering system, wherein such at least one cylindrical tube comprises plastic. In addition, it provides such a tree watering system, wherein such at least one cylindrical tube comprises polyvinyl chloride.

And, it provides such a tree watering system, wherein such at least one cylindrical tube comprises at least one outside diameter of about two inches. Further, it provides such a tree watering system, wherein such at least one cylindrical tube is about eighteen inches long. Even further, it provides such a tree watering system, wherein such at least one cylindrical tube is about twenty-four inches long. Moreover, it provides such a tree watering system, wherein such at least one cylindrical tube is about thirty-six inches long. Additionally, it provides such a tree watering system, wherein such at least one top end of such at least one cylindrical tube is structured and arranged to be positioned above the soil surface and below the blades of a lawnmower. Also, it provides such a tree watering system, wherein such at least one top end of such at least one cylindrical tube is structured and arranged to be positioned about one inch above the soil surface.

In accordance with another preferred embodiment hereof, this invention provides a tree watering system, relating to dispersing water into soil beneath such soil's surface, comprising: at least one first cylindrical tube, comprising at least one first top end, at least one first bottom end, and at least one first sidewall, structured and arranged to contain water; at least one second cylindrical tube, comprising at least one second top end, at least one second bottom end, and at least one second sidewall, structured and arranged to contain water; at least one receiver, structured and arranged to receive water into such at least one first cylindrical tube, adjacent such at least one first top end; at least one disperser structured and arranged to disperse water through such at least one second sidewall of such at least one second cylindrical tube; at least one depth adjuster structured and arranged to adjust the depth of such at least one second cylindrical tube beneath the soil surface; at least one reinforcer structured and arranged to reinforce such at least one first top end of such at least one first tube against driving impact forces; at least one taper structured and arranged to taper such at least one second bottom end of such at least one second cylindrical tube into exactly one closed conical point; and at least one excluder structured and arranged to exclude soil from such at least one second cylindrical tube; wherein such at least one excluder is located inside such at least one second cylindrical tube and adjacent such at least one disperser; wherein the length of such at least one second cylindrical tube is at least five times the outside radius of such at least one second cylindrical tube; wherein such at least one first cylindrical tube is structured and arranged to removably connect to such at least one second cylindrical tube. In addition, it provides such a tree watering system, wherein such at least one second cylindrical tube comprises at least one connector structured and arranged to connect such at least one second top end to such at least one second bottom end.

And, it provides such a tree watering system, wherein such at least one taper is removably attachable to such at least one second bottom end of such at least one second cylindrical tube. Further, it provides such a tree watering system, wherein such at least one reinforcer comprises at least one cap structured and arranged to cap such at least one first top end of such at least one first cylindrical tube. Even further, it provides such a tree watering system, wherein such at least one receiver comprises such at least one first top end of such at least one first cylindrical tube. Moreover, it provides such a tree watering system, wherein such at least one receiver comprises at least one slot through such at least one first sidewall adjacent such at least one first top end of such at least one first cylindrical tube.

Additionally, it provides such a tree watering system, wherein such at least one first cylindrical tube comprises at least one remover structured and arranged to assist removal of such at least one first cylindrical tube from the soil. Also, it provides such a tree watering system, wherein such at least one remover comprises at least one hole in such at least one first sidewall structured and arranged to be accessible from adjacent the soil surface in use. In addition, it provides such a tree watering system, wherein such at least one excluder comprises at least one fabric. And, it provides such a tree watering system, wherein such at least one excluder comprises at least one landscape fabric. Further, it provides such a tree watering system, wherein such at least one second cylindrical tube comprises plastic. Even further, it provides such a tree watering system, wherein such at least one second cylindrical tube comprises polyvinyl chloride.

Moreover, it provides such a tree watering system, wherein such at least one second cylindrical tube comprises at least one outside diameter of about two inches. Additionally, it provides such a tree watering system, wherein such at least one first cylindrical tube and such at least one second cylindrical tube are about eighteen inches long when connected together. Also, it provides such a tree watering system, wherein such at least one first cylindrical tube and such at least one second cylindrical tube are about twenty-four inches long when connected together. In addition, it provides such a tree watering system, wherein such at least one first cylindrical tube and such at least one second cylindrical tube are about thirty-six inches long when connected together.

And, it provides such a tree watering system, wherein such at least one first top end of such at least one first cylindrical tube is structured and arranged to be positioned above the soil surface and below the blades of a lawnmower. Further, it provides such a tree watering system, wherein such at least one first top end of such at least one first cylindrical tube is structured and arranged to be positioned about one inch above the soil surface.

In accordance with another preferred embodiment hereof, this invention provides a tree watering kit, relating to dispersing water into soil beneath such soil's surface, comprising: at least one first cylindrical tube, comprising at least one first top end, at least one first bottom end, and at least one first sidewall, structured and arranged to contain water, wherein such at least one first cylindrical tube comprises at least one receiver, structured and arranged to receive water into such at least one first cylindrical tube, adjacent such at least one first top end; at least one depth adjuster structured and arranged to adjust the depth of such at least one second cylindrical tube beneath the soil surface; and at least one reinforcer structured and arranged to reinforce such at least one first top end of such at least one first tube against driving impact forces; at least one second cylindrical tube, comprising at least one second top end, at least one second bottom end, and at least one second sidewall, structured and arranged to contain water, wherein such at least one second cylindrical tube comprises at least one disperser structured and arranged to disperse water through such at least one second sidewall of such at least one second cylindrical tube; wherein the length of such at least one second cylindrical tube is at least five times the outside radius of such at least one second cylindrical tube; at least one taper structured and arranged to taper such at least one second bottom end of such at least one second cylindrical tube into exactly one closed conical point; and wherein such at least one first bottom end of such at least one first cylindrical tube is structured and arranged to removably connect to such at least one second top end of such at least one second cylindrical tube; at least one excluder structured and arranged to exclude soil from such at least one second cylindrical tube; wherein such at least one excluder is structured and arranged to be located inside such at least one second cylindrical tube and adjacent such at least one disperser; and at least one packaging structured and arranged to package such at least one first cylindrical tube, such at least one second cylindrical tube, and such at least one excluder for sale.

Even further, it provides such a tree watering kit, wherein such at least one taper is removably attachable to such at least one second bottom end of such at least one second cylindrical tube. Even further, it provides such a tree watering kit, wherein such at least one reinforcer comprises at least one cap structured and arranged to cap such at least one first top end of such at least one first cylindrical tube.

Even further, it provides such a tree watering system, wherein such at least one first cylindrical tube and such at least one second cylindrical tube are about eighteen inches long when connected together. Even further, it provides such a tree watering system, wherein such at least first cylindrical tube and such at least one second cylindrical tube are about twenty-four inches long when connected together. Even further, it provides such a tree watering system, wherein such at least one first cylindrical tube and such at least one second cylindrical tube are about thirty-six inches long when connected together.

In accordance with another preferred embodiment hereof, this invention provides a tree watering system, comprising: injector means for injecting water into the soil, wherein such injector means comprises tube means for containing water; receiver means for receiving water into such tube means; and disperser means for dispersing water from such tube means; soil displacer means for displacing the soil, wherein such soil displacer means comprises reinforcer means for reinforcing such injector means against impact forces adjacent such receiver means; shaper means for shaping such tube means into at least one right cylinder; and taper means for tapering such linear extender means into exactly one conical point; and excluder means for excluding soil from such tube means; wherein such excluder means is located inside such tube means and adjacent such disperser means; and wherein such injector means comprises such soil displacer means.

In accordance with another preferred embodiment hereof, this invention provides such a plant watering system, comprising each and every novel feature, element, combination, step and/or method disclosed or suggested herein.

BRIEF DESCRIPTION OF THE DRAWINGS

FIG. 1A shows a side view, in partial section, illustrating the use of a set of plant waterers, according to preferred embodiments of the present invention.

FIG. 1B shows a side view, magnified to better illustrate preferred features of the embodiments of FIG. 1A.

FIG. 2 shows an exploded perspective view illustrating a plant watering system according to a preferred embodiment of the present invention.

FIG. 3 shows a perspective view, illustrating the plant watering system according to the preferred embodiment of FIG. 2, assembled with hidden details shown.

FIG. 4 shows a perspective view illustrating the plant watering system of FIG. 2 assembled.

FIG. 5 shows an exploded perspective view illustrating a plant watering system, comprising a center shaft having a first length, according to a preferred embodiment of the present invention.

FIG. 6 shows an exploded perspective view illustrating the plant watering system according to the preferred embodiment of FIG. 5, showing a second length of the center shaft.

FIG. 7 shows an exploded perspective view illustrating the plant watering system according to the preferred embodiment of FIG. 5, showing a third length of the center shaft and showing a kit according to a preferred embodiment of the present invention.

FIG. 8 shows an exploded perspective view illustrating a plant watering system according to another preferred embodiment of the present invention.

FIG. 9 shows an exploded perspective view illustrating a plant watering system according to yet another preferred embodiment of the present invention.

FIG. 10 shows an exploded perspective view, illustrating a plant watering system, according to another preferred embodiment of the present invention.

FIG. 11 shows a perspective view, illustrating the plant watering system, of FIG. 10 in an assembled configuration.

FIG. 12 shows a plan view of the underside of a cap of the plant watering system of FIG. 10.

FIG. 13 shows a perspective view of the cap of FIG. 12.

FIG. 14 shows a cross-sectional view, of the section 14-14 of FIG. 12, illustrating the cap of the plant watering system of FIG. 10.

FIG. 15 shows a side view, in partial cross section, illustrating the reinforced spike of the plant watering system of FIG. 10.

FIG. 16 shows a plan view illustrating an alternate embodiment of a reinforced spike of the plant watering system of FIG. 10.

FIG. 17 shows an exploded perspective view illustrating a plant watering system according to yet another preferred embodiment of the present invention.

FIG. 18 shows a perspective view illustrating the plant watering system of FIG. 17 in an assembled configuration.

FIG. 19 shows a plan view of the underside of a cap of the plant watering system of FIG. 17.

FIG. 20 shows a perspective view of the cap of FIG. 19.

FIG. 21 shows a cross-sectional view of the cap of the plant watering system of FIG. 17 through the section 21-21 of FIG. 19.

FIG. 22 shows a cross-sectional view of the section 22-22 illustrating the reinforced spike of the plant watering system of FIG. 17.

FIG. 23 shows a top plan view illustrating an alternate embodiment of the reinforced spike of the plant watering system of FIG. 17.

FIG. 24 shows a partial perspective view illustrating a preferred perforation arrangement of a plant watering system according to a preferred embodiment of the present invention.

FIG. 25 shows a perspective view illustrating the use of an herbicide with a plant watering system according to a preferred embodiment of the present invention.

FIG. 26 shows a side view illustrating a modular plant waterer, in a preferred first configuration, according to an alternate preferred embodiment of the present invention.

FIG. 27 shows a top view of the modular plant waterer, according to the preferred embodiment of FIG. 26.

FIG. 28 shows a sectional view, through the section 28-28 of FIG. 27, illustrating the preferred internal arrangements of the modular plant waterer.

FIG. 29 shows an exploded view of a set of preferred components of the modular plant waterer.

Figure 30:
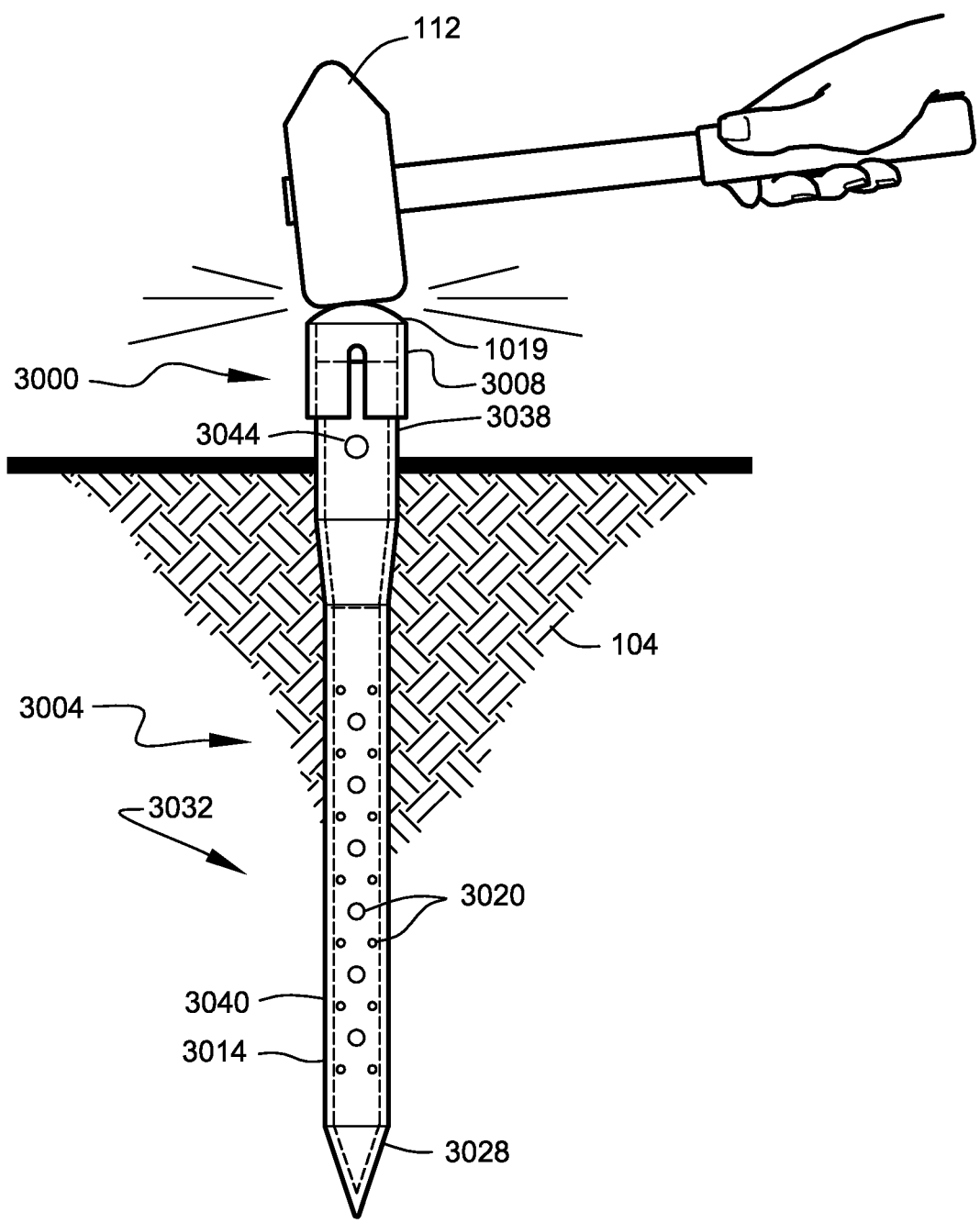
FIG. 30 shows a side view, in partial section, illustrating the installation of the modular plant waterer, comprising a preferred second configuration, according to another preferred embodiment of the present invention.

DETAILED DESCRIPTION OF THE BEST MODES AND PREFERRED EMBODIMENTS OF THE INVENTION

FIG. 1A shows a side view illustrating the preferred use of plant waterers 110, according to preferred embodiments of the present invention. FIG. 1B shows a side view, magnified to better illustrate preferred features of the preferred embodiments of FIG. 1A.

Plant watering system 100 preferably comprises plant waterer 110, as shown. FIG. 1A shows two plant waterers 110 driven into the soil 104, to a position substantially below soil surface 108, near plant 102. Plant waterer 110 is preferably driven into the soil 104 to deliver at least one aqueous liquid 114, preferably at least water (such as, a water/nutrient mix) to the root zone 106 of plant 102, as shown. Preferably, plant waterer 110 is driven into the ground with a hammer 112, or similar device, as best illustrated in FIG. 30.

Preferably, plant waterer 110 comprises at least the following: tube 122, spike 136 (which is tapered and closes to a closed conical point, as shown), cap 133, and a material excluder, preferably a liquid-permeable fabric 142 (see FIGS. 2 and 3) (at least embodying herein such at least one material excluder comprises at least one liquid-permeable fabric overlaying and situate adjacent an inner-wall surface of such at least one sidewall), as shown. As plant waterer 110 is driven into a soil surface, spike 136 and tube 122 displace the punctured soil so that plant waterer 110 is retained firmly within soil 104. After such insertion, the plant waterer 110 may remain in place indefinitely. Upon reading the teachings of this specification, those with ordinary skill in the art will now understand that, under appropriate circumstances, considering such issues as advances in technology, user preference, etc., other installation methods, such as burying the spike (displacer) when a plant is planted, digging a hole to install the spike adjacent an established tree, etc., may suffice.

Tube 122 preferably comprises a hollow cylinder, as shown. Tube 122 preferably comprises top end 123, bottom end 124, and sidewall 125, as shown (at least embodying herein at least one cylindrical tube comprising at least one top end, at least one bottom end, and at least one sidewall, structured and arranged to contain water and at least embodying herein at least one cylindrical tube structured and arranged to permit the flow of at least water from the at least water source to the root zone of a plant comprising at least one top end, at least one bottom end, and at least one sidewall; wherein such at least one cylindrical tube is structured and arranged to receive at least water from such at least water source into such at least one cylindrical tube; wherein such at least one cylindrical tube is structured and arranged to disperse at least water through such at least one sidewall of such at least one cylindrical tube; wherein depth placement beneath the soil of such at least one cylindrical tube is selectable; at least one cap structured and arranged to cap such at least one cylindrical tube at such at least one top end; wherein such at least one cap is structurally reinforced to permit pounding such plant watering system into soil without breaking such plant watering system with such at least one cap installed on such at least one top end; at least one spike connected to such at least one cylindrical tube at such at least one bottom end; wherein such at least one spike tapers from such at least one bottom end to exactly one closed conical point; at least one excluder structured and arranged to exclude soil from the interior of such at least one cylindrical tube; wherein such at least one excluder is located adjacent an internal wall of such at least one cylindrical tube).

In a preferred embodiment, sidewall 125 preferably comprises slot 127 which is preferably formed within sidewall 125 adjacent top end 123, as shown (at least embodying herein wherein such at least one receiver comprises at least one slot through such at least one sidewall adjacent such at least one top end of such at least one cylindrical tube). Slot 127 preferably receives water source tubing, as shown, for example, in FIG. 1. Top end 123, is preferably open, as shown (at least embodying herein wherein such at least one receiver comprises such at least one top end of such at least one cylindrical tube). Preferably, the combination of the open top end 123 and slot 127 (at least embodying herein at least one receiver, structured and arranged to receive water into such at least one tube, adjacent such at least one top end of such at least one tube) permits the introduction of an emitter, of at least one drip irrigation line 105, into the interior of hollow tube 122. Drip irrigation line 105 is preferably coupled to at least one aqueous liquid source 116, such as, for example, an underground irrigation system. Tube 122 is preferably structured and arranged to permit the flow of aqueous liquid 114 from aqueous liquid source 116 to the root zone 106 of plant 102, as shown. Upon reading the teachings of this specification, those with ordinary skill in the art will now understand that, under appropriate circumstances, considering such issues as advances in technology, user preference, etc., other receivers, such as emitter ports, hose connections, sprinkler pipe attachments, etc., may suffice.

Preferably, the embodiment in FIG. 1A may be driven into the ground a sufficient distance so that cap 133 and slot 127 are above a soil surface, as shown. Preferably, a lawnmower, or other gardening maintenance device, may be operated over the installed plant water 110 without risking breakage of plant waterer 110, especially cap 133.

Preferably, tube 122 comprises durable material, preferably plastic (at least embodying herein wherein such at least one cylindrical tube comprises plastic). Most preferably, tube 122 comprises polyvinyl chloride (PVC) plastic (at least embodying herein wherein such at least one cylindrical tube comprises polyvinyl chloride). Preferably, tube 122 comprises PVC pipe. Preferably, tube 122 comprises Schedule 80 PVC pipe. Preferably, such PVC plastic contains ultraviolet (UV) stabilizers. Such PVC plastic is preferably tinted to resist damage from UV light. Preferably, such PVC plastic comprises at least pigment to resist damage from UV light. Such PVC plastic preferably comprises at least a tan pigment. Preferably, at least the cap 133 comprises a tan pigment (such at least one structurally reinforced cap comprises ultra-violet (UV) stabilizers structured and arranged to resist material decomposition due to ultra-violet radiation).

Preferably, sidewalls 125 are between about one-tenth inch and about three-tenths inches thick. Preferably, the length of tube 122 is at least five times the outside radius of tube 122, as shown (at least embodying herein wherein the length of such at least one cylindrical tube is at least five times the outside radius of such at least one cylindrical tube). Preferably, tube 122 is about eighteen inches long (at least embodying herein wherein such at least one cylindrical tube is about eighteen inches long). Preferably, tube 122 is about twenty-four inches long (at least embodying herein wherein such at least one cylindrical tube is about twenty-four inches long). Preferably, tube 122 is about thirty-six inches long (at least embodying herein wherein such at least one cylindrical tube is about thirty-six inches long). Upon reading the teachings of this specification, those with ordinary skill in the art will now understand that, under appropriate circumstances, considering such issues as advances in technology, user preference, etc., other tube materials, such as metal, ceramic, fiberglass, etc., may suffice.

Preferably, tube 122 permits water to flow out of tube 122 at a selected depth and into the surrounding soil. Preferably, tube 122 (at least embodying herein at least one disperser structured and arranged to disperse water through such at least one sidewall of such at least one tube) comprises a plurality of perforations 129 through sidewall 125, as shown. Preferably, perforations 129 are between about one-sixteenth inch and about one-inch in diameter. More preferably, perforations 129 are between about one-quarter inch and about one-half inch in diameter. Preferably, perforations 129 are arrayed across tube 122 in a pattern structured and arranged to evenly distribute water around the circumference of tube 122, as shown. Preferably, perforations 129 are arrayed across tube 122 in a pattern structured and arranged to maintain the physical strength and integrity of tube 122 such that tube 122 is able to physically withstand being driven into the ground without structural failure, as shown. Preferably, perforations 129 are arrayed in parallel lines along the length of tube 122 so that strong, uninterrupted material remains between each line of perforations 129, as shown. Upon reading the teachings of this specification, those with ordinary skill in the art will now understand that, under appropriate circumstances, considering such issues as advances in technology, user preference, etc., other dispersers, such as permeable-material portions of the tube, other perforation patterns, etc., may suffice.

Preferably, spike 136 taper to a conical point and is structured and arranged to puncture and displace soil, as shown.

Preferably, cap 133 reinforces plant waterer 110 against the force of impact used to drive plant waterer 110 into the ground, preferably against the force of a sledgehammer strike. Preferably, cap 133 reinforces plant waterer 110 against the force of impact used to drive plant waterer 110 into the ground preferably without causing structural failure of cap 133 or plant waterer 110. Preferably, cap 133 covers top end 123, as shown. Preferably, cap 133 fits onto top end 123 securely and preferably protects top end 123 from splaying out, collapsing inward, or fragmenting apart, so as to prevent structural damage to plant waterer 110 during hammering. Preferably, cap 133 comprises durable material, preferably plastic, most preferably polyvinyl chloride plastic (PVC). Preferably, cap 133 (at least embodying herein at least one reinforcer structured and arranged to reinforce such at least one top end of such at least one tube against driving impact forces) comprises a PVC pipe end-cap. Upon reading the teachings of this specification, those with ordinary skill in the art will now understand that, under appropriate circumstances, considering such issues as advances in technology, user preference, etc., other reinforcers, such as a strong closed top end, a driving tool that covers the top end while the plant waterer is pressed into the soil, a solid insert that fills the plant waterer while the plant waterer is hammerer into the soil, etc., may suffice.

Preferably, tube 122 comprises a substantially smooth-sided right cylinder, as shown. Preferably, tube 122 comprises a round hollow tube, as shown. Preventing changes in radius and shape along the length of tube 122 makes it much easier to drive plant waterer 110 into the ground. Upon reading the teachings of this specification, those with ordinary skill in the art will now understand that, under appropriate circumstances, considering such issues as advances in technology, user preference, etc., other tube shapes, such as screw-shaped, longitudinally ridged, etc., may suffice.

Preferably, spike 136 extends from bottom end 124 of tube 122, as shown. Preferably, spike 136 assists in pushing ground, or soil, aside as plant waterer 110 is driven into the ground. Preferably, spike 136 ends in a conical point, as shown. Preferably, for durability, spike 136 preferably is solid and not completely hollow, as shown in FIG. 2. Preferably, spike 136 comprises durable material, preferably plastic, most preferably PVC plastic. Spike 136 preferably withstands pressure from impacting the ground and pressure from penetrating through soil, during hammering, without being damaged or having the structural integrity of the device compromised. Preferably, spike 136 is flush with tube 122 at bottom end 124, as shown, so that plant waterer 110 moves smoothly through the soil. Preferably, spike 136 (at least embodying herein at least one taper structured and arranged to taper such at least one bottom end of such at least one tube into exactly one closed conical point) is at least about twice as long as it's diameter, as shown. Upon reading the teachings of this specification, those with ordinary skill in the art will now understand that, under appropriate circumstances, considering such issues as advances in technology, user preference, etc., other taper designs, such as a wedge, a pyramid, a graduated taper, the taper being part of the disperser, etc., may suffice.

Preferably, internal filter 140 excludes, or prevents, soil and related particles from entering tube 122 through perforations 129 while permitting water to flow into the soil from perforations 129. Preferably, internal filter 140 is placed within tube 122 adjacent the interior of sidewall 125, as shown (at least embodying herein wherein such at least one excluder is located inside such at least one tube and adjacent such at least one disperser; and at least embodying herein wherein such excluder means is located inside such tube means and adjacent such disperser means). Internal filter 140 (at least embodying herein at least one excluder structured and arranged to exclude soil from such at least one tube; and at least embodying herein excluder means for excluding soil from such tube means) is further described with respect to FIG. 2.

Preferably, plant waterer 110 is driven almost entirely into the ground with a sledgehammer, hammer, etc., and then water is poured or otherwise introduced into plant waterer 110 through top end 123 and slot 127, as shown. Preferably, the water percolates out of plant waterer 110 directly into the root zone of the plant, as shown. Preferably, plant waterer 110 is left in place indefinitely. Preferably, plant waterer 110 is left in place indefinitely to receive water provided by a drip irrigation system, as shown. Preferably, one or more of plant waterer 110 are used per plant, depending on the size of the plant, preferably one plant waterer 110 is used per drip system emitter, as shown.

Preferably, plant watering system 100 is driven into the ground deep enough to place perforations 129 at a desired depth, as shown. Preferably, plant watering system 100 is driven into the ground nearly to top end 123, as shown. More preferably, plant watering system 100 is driven into the ground deeply enough that top end 123 (and/or cap 133) are below the level of lawnmower blades (at least embodying herein wherein such at least one top end of such at least one cylindrical tube is structured and arranged to be positioned above the soil surface and below the blades of a lawnmower). Most preferably, plant watering system 100 is driven into the ground deeply enough that top end 123 (and/or cap 133) are less than about one inch above the soil surface (at least embodying herein wherein such at least one top end of such at least one cylindrical tube is structured and arranged to be positioned less than about one inch above the soil surface).

FIG. 2 shows an exploded perspective view illustrating a plant watering system according to a preferred embodiment of the present invention. Preferably, plant watering system 100 comprises plant waterer 111, as shown. Preferably, plant waterer 111 comprises cap 133, spike 136, internal filter 140, as shown. Preferably, in the embodiment of FIG. 2, two tubular segments are preferred (instead of a single tube 122 as shown in FIG. 1), namely top tube 220 and bottom tube 222, as shown. Preferably, internal filter 140 comprises fabric 142, as shown. Preferably, fabric 142 (at least embodying herein wherein such at least one excluder comprises at least one fabric) is rolled into a tube having about the same diameter as the internal diameter of bottom tube 222, as shown. Preferably, the resulting tube of fabric 142 is inserted into bottom tube 222 such that internal filter 140 presses against the internal sidewall of bottom tube 222 and perforations 129, as shown. Preferably, internal filter 142 prevents soil particles from entering bottom tube 222 through perforations 129. Most preferably, internal filter 142 comprises at least one landscape fabric, preferably at least one airlaid polymer fabric (at least embodying herein wherein such at least one excluder comprises at least one landscape fabric). Upon reading the teachings of this specification, those with ordinary skill in the art will now understand that, under appropriate circumstances, considering such issues as advances in technology, user preference, etc., other excluders, such as permeable-material portions of the tube, a cylindrical porous insert into the tube instead of a tube of fabric, etc., may suffice.

Preferably, top tube 220 and bottom tube 222 connect together with an outside flush joint (where the outside diameter of the cylinder is substantially unchanged across the joint), as shown (at least embodying herein wherein such at least one first cylindrical tube is structured and arranged to removably connect to such at least one second cylindrical tube). Preferably, top tube 220 and bottom tube 222 connect together with unthreaded flush joint 250, as shown. The length of watering system 100, and specifically of plant waterer 111 when top tube 220 is connected to bottom tube 222, is preferably variable to accommodate various applications. Preferably, top tube 220 and bottom tube 222 are at least 18 inches long when they are attached together. Preferably, top tube 220 (at least embodying herein at least one first cylindrical tube comprising at least one first top end, at least one first bottom end, and at least one first sidewall, structured and arranged to contain water) and bottom tube 222 (at least embodying herein at least one second cylindrical tube comprising at least one second top end, at least one second bottom end, and at least one second sidewall, structured and arranged to contain water) are at least 24 inches long when they are attached together. Preferably, top tube 220 and bottom tube 222 (at least embodying herein at least one depth adjuster structured and arranged to adjust the depth of such at least one second cylindrical tube beneath the soil surface) are at least 36 inches long when they are attached together. Preferably, the length is selected to meet the needs of the plant being watered and the permeability of the soil. Larger trees will typically need longer plant watering systems 100 than smaller plants. Compacted soils will typically need longer plant watering systems 100 than porous soils use. Upon reading the teachings of this specification, those with ordinary skill in the art will now understand that, under appropriate circumstances, considering such issues as advances in technology, user preference, etc., other sizes, such as one foot long, five feet long, etc., may suffice.

Preferably, top tube 220 and bottom tube 222 are at least about one inch in outside diameter. More preferably, top tube 220 and bottom tube 222 are at least about two inches in outside diameter (at least embodying herein wherein such at least one cylindrical tube comprises at least one outside diameter of about two inches). Preferably, bottom tube 222 is at least about five times longer than the outside diameter of bottom tube 222, as shown (at least embodying herein wherein the length of such at least one second cylindrical tube is at least five times the outside radius of such at least one second cylindrical tube). Upon reading the teachings of this specification, those with ordinary skill in the art will now understand that, under appropriate circumstances, considering such issues as advances in technology, user preference, etc., other diameters, such as four inches, six inches, etc., may suffice.

Preferably, cap 133 fits over top end 123 of top tube 220, as shown. Preferably, cap 133 reinforces top end 123 while plant waterer 110 is being driven into the ground (at least embodying herein at least one reinforcer structured and arranged to reinforce such at least one first top end of such at least one first tube against driving impact forces). Preferably, cap 133 (at least embodying herein wherein such at least one reinforcer comprises at least one cap structured and arranged to cap such at least one top end of such at least one cylindrical tube) remains over top end 123 in use, as shown in FIG. 1, in order to help prevent debris from dropping into tube 122.

Preferably, spike 136 tapers from a point located on the outside diameter of bottom tube 222, as shown. Preferably, spike 136 (at least embodying herein at least one taper structured and arranged to taper such at least one second bottom end of such at least one second cylindrical tube into exactly one closed conical point) and bottom tube 222 connect together with an outside flush joint, as shown. Preferably, spike 136 and bottom tube 222 connect together with unthreaded flush joint 260, as shown (at least embodying herein wherein such at least one taper is removably attachable to such at least one bottom end of such at least one cylindrical tube). Upon reading the teachings of this specification, those with ordinary skill in the art will now understand that, under appropriate circumstances, considering such issues as advances in technology, user preference, etc., other flush joints, such as threaded flush joints, glued butt joints, interlocking flush joints, etc., may suffice.

Preferably, perforations 129 are evenly distributed around the circumference of tube 122, as shown. Preferably, perforations 129 (at least embodying herein at least one disperser structured and arranged to disperse water through such at least one second sidewall of such at least one second cylindrical tube) are distributed at least adjacent bottom end 124, as shown. Upon reading the teachings of this specification, those with ordinary skill in the art will now understand that, under appropriate circumstances, considering such issues as advances in technology, user preference, etc., other perforation distributions, such as directional, at multiple spike level depths, etc., may suffice.

Preferably, plant waterer 111, particularly top tube 220, comprises one or more holes 292 (at least embodying herein wherein such at least one cylindrical tube comprises at least one remover structured and arranged to assist removal of such at least one cylindrical tube from the soil) structured and arranged to be adjacent the soil surface after plant waterer 111 is installed, as shown. Preferably, holes 292 (at least embodying herein wherein such at least one remover comprises at least one hole in such at least one sidewall structured and arranged to be accessible from adjacent the soil surface in use) are structured and arranged to receive at least one pulling tool, such as, for example, a metal rod, that can be used to pull, or assist removal or extraction, plant waterer 111 up out of the ground. Upon reading the teachings of this specification, those with ordinary skill in the art will now understand that, under appropriate circumstances, considering such issues as advances in technology, user preference, etc., other methods of removing the plant waterer from the soil, such as with a barbed tool that grips the interior of the tube, by digging it up, using a long-term or short-term soluble plastic, etc., may suffice.

FIG. 3 shows a perspective view, illustrating the plant watering system according to the preferred embodiment of FIG. 2, assembled with hidden details shown. Preferably, internal filter 140 (at least embodying herein at least one excluder structured and arranged to exclude soil from such at least one second cylindrical tube) lies adjacent all of perforations 129, as shown (at least embodying herein wherein such at least one excluder is located inside such at least one second cylindrical tube and adjacent such at least one disperser). Upon reading the teachings of this specification, those with ordinary skill in the art will now understand that, under appropriate circumstances, considering such issues as advances in technology, user preference, etc., other arrangements, such as the excluder and disperser functions both being performed by a porous plastic tube, etc., may suffice.

FIG. 4 shows a perspective view illustrating the plant watering system of FIG. 2 assembled. Preferably, slot 127 is preferably cut into sidewall 125 adjacent top end 123, as shown. Preferably, slot 127 extends farther from top end 123 than cap 133 when cap 133 is installed, as shown, so that at least one portion of slot 127 is available to water into plant waterer 111, as shown. Preferably, slot 127 (at least embodying herein at least one receiver, structured and arranged to receive water into such at least one first cylindrical tube, adjacent such at least one first top end) receives at least one drip irrigation line 105 which drips water into plant waterer 111, as shown in FIG. 1.

FIG. 5 shows an exploded perspective view illustrating a plant watering system, comprising a center shaft having a first length, according to a preferred embodiment of the present invention. Preferably, plant waterer 510 comprises three tubes, namely, top tube 520, center tube 519, and bottom tube 518, as shown.

Preferably, top tube 520 and center tube 519 connect together with an outside flush joint, as shown. Preferably, top tube 520 and center tube 519 connect together with unthreaded flush joint 525, as shown.

Preferably, center tube 519 and bottom tube 518 connect together with an outside flush joint, as shown. Preferably, center tube 519 and bottom tube 518 connect together with unthreaded flush joint 545, as shown.

Preferably, top tube 520 comprises male portion 521 of unthreaded flush joint 525, as shown. Preferably, bottom tube 518 comprises male portion 551 of unthreaded flush joint 545, as shown. Preferably, center tube 519 comprises female portion 522 of unthreaded flush joint 525 and female portion 552 of unthreaded flush joint 545, as shown. Preferably, center tube 519 comprises at least one length of pipe. Preferably, bottom tube 518 comprises at least one length of PVC pipe.

Preferably, the length of bottom tube 518 is selected to size plant waterer 510 to the desired depth. Preferably, bottom tube 518 comprises a length of standard PVC pipe cut to the desired length. Upon reading the teachings of this specification, those with ordinary skill in the art will now understand that, under appropriate circumstances, considering such issues as advances in technology, user preference, etc., other length adjustment arrangements, such as cutting the second section to the desired length, etc., may suffice.

FIG. 6 shows an exploded perspective view illustrating plant watering system 510 according to the preferred embodiment of FIG. 5, showing a second length of center tube 519.

FIG. 7 shows an exploded perspective view illustrating the plant watering system according to the preferred embodiment of FIG. 5, showing a third length of the center tube 519 and showing a kit according to a preferred embodiment of the present invention.

FIG. 5 through FIG. 7 illustrate the modularity of plant watering system 100 and that a user may achieve a selected depth of plant watering system 100 by selecting a particular length of the center tube.

Kit 700 preferably comprises top tube 520, center tube 519, and bottom tube 518, internal filter 140, cap 133, spike 136, and packaging 705, as shown (at least embodying herein a plant watering kit comprising: at least one first cylindrical tube; at least one second cylindrical tube, at least one disperser structured and arranged to disperse water through such at least one second cylindrical tube; at least one excluder structured and arranged to exclude soil from such at least one second cylindrical tube, wherein such at least one excluder is structured and arranged to be located inside such at least one second cylindrical tube and adjacent such at least one disperser; and at least one packaging structured and arranged to package such at least one first cylindrical tube, such at least one second cylindrical tube, and such at least one excluder for sale). Upon reading the teachings of this specification, those with ordinary skill in the art will now understand that, under appropriate circumstances, considering such issues as advances in technology, user preference, etc., other kit components, such as tools, instructions, fertilizers and/or other additives to place in the plant waterer for dissolution, a hammer, a remover tool, fewer components where the taper is integral with the tube, fewer components where the tube has one or two total sections, more components where the tube has four or more sections, etc., may suffice.

FIG. 8 shows an exploded perspective view illustrating a plant watering system according to another preferred embodiment of the present invention. Preferably, tube 122 comprises a single jointless tube, as shown.

FIG. 9 shows an exploded perspective view illustrating a plant watering system according to yet another preferred embodiment of the present invention. Plant waterer 110 preferably comprises plant waterer 910 (at least embodying herein injector means for injecting water into the soil, wherein such injector means comprises tube means for containing water, receiver means for receiving water into such tube means and disperser means for dispersing water from such tube means; and at least embodying herein soil displacer means for displacing the soil, wherein such soil displacer means comprises reinforcer means for reinforcing such injector means against impact forces adjacent such receiver means, shaper means for shaping such tube means into at least one right cylinder, and taper means for tapering such linear extender means into exactly one conical point; and at least embodying herein wherein such injector means comprises such soil displacer means), as shown. Preferably, plant waterer 910 comprises tube 922, as shown. Preferably, tube 922 and taper 136 comprise a single jointless assembly, as shown. Preferably, tube 922 is manufactured by molding tube 922 and then making perforations 129. In a preferred alternate embodiment, tube 922 is manufactured by molding tube 922 with perforations 129 in a single step.

FIG. 10 an exploded perspective view illustrating a plant watering system according to another preferred embodiment of the present invention. Preferably, plant waterer 110 comprises plant waterer 1010, as shown (at least embodying herein at least one cylindrical tube structured and arranged to permit the flow of the at least one aqueous liquid from the at least one aqueous liquid source to the root zone of the plant comprising at least one top end portion, at least one bottom end portion, and at least one sidewall extending therebetween). Preferably, plant waterer 1010 comprises cap 1015, first shaft 1020, and second shaft 1025, ending in spike 1030, as shown. Preferably, first shaft 1020 comprises a variety of lengths as described, for example, in FIGS. 5-7. First shaft 1020 is preferably constructed so that first shaft 1020 fits onto second shaft 1025, as shown. Preferably, second shaft 1025 comprises shelf 1035 and male portion 1040, as shown. Preferably, first shaft 1020 comprises female portion 1045, as shown. Preferably, male portion 1040 is inserted into female portion 1045 to assemble plant waterer 1010, as shown (see FIG. 11). As shown in FIG. 11, the bottom end of first shaft 1020 rests on shelf 1035. Preferably, first shaft 1020 comprises slit 1017 structured and arranged to receive a drip irrigation line.

Preferably, second shaft 1025 comprises first taper 1050 and second taper 1055, as shown. Preferably, first taper 1050 narrows second shaft 1025 to a diameter smaller than that of the first shaft, as shown. Preferably, second taper 1055 narrows second shaft 1025 to end in spike 1030, as shown. Preferably, first shaft 1020 comprises a diameter of about one and one-quarter inches. Preferably, second shaft 1025 comprises a diameter of about one inch.

Preferably, cap 1015 fits over the exterior of first shaft 1020, as shown. Preferably, cap 1015 is secured to the top of first shaft 1020 with a sufficiently tight fit so that cap 1015 will not be easily removed from first shaft 1020. Preferably, cap 1015 comprises slit 1018 structured and arranged to permit insertion and removal of tubing, or a drip irrigation line, into, for example, first shaft 1025 so that the root zone of a plant may receive water as describe herein. Preferably, cap 1015 is about one and three-quarter inches in height. Preferably, cap 1015 comprises an outer diameter of about one and one-half inches. Preferably, cap 1015 comprises domed top 1019, as shown (the above arrangement at least embodying herein such at least one domed-shaped force distributor comprises a domed-shaped top about one and three-quarter inch in height, and one and one-half inch in outer diameter; and such at least one structural web framework extends downwardly about one-inch from such at least one upper inner surface of such at least one structurally reinforced cap). Upon reading this specification, those with ordinary skill in the art will now appreciate that, under appropriate circumstances, considering such issues as design preference, user preferences, marketing preferences, cost, structural requirements, available materials, technological advances, etc., other impact resisting/force distribution cap geometries such as, for example, frustoconical shapes and prismatic solids having multiple adjoining faces (triangular, quadrilateral, pentagonal, hexagonal, heptagonal, and octatgonal, etc.) etc., may suffice.

Plant waterer 110 is preferably driven into the ground, preferably with an impact apparatus, preferably with a hand-operated hammer 112, as shown, or preferably other apparatus capable of providing impact forces sufficient to drive plant waterer 110 into the ground and penetrate though the soil. Plant waterer 110 is preferably driven into the ground by striking domed top 1019, as shown in FIG. 30, preferably striking domed top 1019, preferably multiple times, preferably with force to drive plant waterer 110 into the ground and penetrate though soil. Cap 1015 (at least embodying herein at least one structurally reinforced cap structured and arranged to cap such at least one cylindrical tube, such at least one structurally reinforced cap comprising at least one upper outer surface, at least one upper inner surface, and at least one first structural reinforcer structured and arranged to reinforce such at least one structurally reinforced cap against structural failure during at least one longitudinally applied impact force sufficient to effectuate penetration into the soil, wherein such at least one first structural reinforce comprises at least one domed-shaped force distributor structured and arranged to distribute at least one longitudinally applied impact force, applied to such at least one upper outer surface, to at least one cap sidewall, and wherein, when such at least one structurally reinforced cap is coupled onto such at least one cylindrical tube, such at least one domed-shaped force distributor assists force distribution of such at least one longitudinally applied impact force to such at least one top end portion and to such at least one sidewall of such at least one cylindrical tube to effectuate penetration of such at least one cylindrical tube through the soil) preferably resists structural failure when struck with hammer 112, during soil penetration, preferably regardless of the composition, porosity, or other characteristics of the soil. In more specific terms, cap 1015 is preferably configured to resist structural failure when a striking force is applied to cap 1015 by a hammer 112 having a head weight of between about one and five pounds and head-speed/acceleration dynamics consistent with the conventional manual operation of these hammers 112 by an adult human user. Upon reading this specification, those with ordinary skill in the art will now appreciate that, under appropriate circumstances, considering such issues as design preference, user preferences, marketing preferences, cost, structural requirements, available materials, technological advances, etc., other hammer arrangements such as, for example, sledgehammer, rock, impact driver, etc., may suffice. Preferably, cap 1015 comprises a substance that protects from the effect of ultraviolet radiation, preferably pigments, preferably tan pigments.

Preferably second shaft 1025 comprises perforations, as described above, for the release of fluid, as shown. Preferably, second shaft comprises excluder 240 (fabric 242) placed within second shaft 1025 to prevent blockage of perforations in second shaft 1025, as shown.

FIG. 11 shows a perspective view illustrating the plant watering system of FIG. 10 in an assembled configuration. Preferably, slit 1017 of cap 1015 and slit 1018 of first shaft 1020 are aligned, as shown, to receive a drip irrigation line.

FIG. 12 shows a plan view of the underside of a cap of the plant watering system of FIG. 10. Cap 1015 preferably comprises reinforcing assembly 1103 and open end 1016, as shown. Reinforcing assembly 1103 preferably comprises a plurality of struts 1105 (at least embodying herein such at least one first structural reinforcer comprises at least one structural web framework; and such at least one at least one structural web framework comprises at least eight struts arranged around a central axis in equidistant arrangement) extending radially from central axis 1110, preferably hollow, (the central axis is the axis parallel to the outer edge of cap 1015), as shown. Preferably, cap 1015 comprises eight struts arranged around central axis 1110, as shown. Preferably, the angle between each strut is about 45 degrees, as shown. Preferably, between each strut 1105 is space 1115, as shown. Such an arrangement provides a sufficiently strong reinforced cap while balancing manufacturing considerations, such as drying time of plastic.

Domed top 1019 preferably distributes downward impact forces, preferably applied during hammering, to assist driving plant waterer 110 into the ground and penetrating through soil. Impact forces are preferably transferred through domed top 1019 and are preferably distributed through the reinforcing assembly 1103 (at least embodying herein such at least one structural reinforcer comprises at least one force distributor structured and arranged to distribute such at least one longitudinally applied impact force, applied to such at least one structurally reinforced cap, to at least one cap sidewall, and such at least one structurally reinforced cap comprises at least one force transferor structured and arranged to transfer such at least one downwardly applied impact force to such at least one top end portion and to such at least one sidewall of such at least one cylindrical tube, when such at least one structurally reinforced cap is coupled onto such at least one cylindrical tube), preferably through at least one plurality of struts 1105. Thus, impact forces are preferably distributed more evenly through domed top 1019. Domed top 1019 preferably assists preventing structural failure of cap 110. Distribution of impact forces preferably assist preventing cap 1015 and open end 1016 from splaying outward and breaking when struck by such impact forces. Reinforcing assembly 1103 preferably assist preventing cap 1015 and open end 1016 from splaying outward and breaking when struck by such impact forces. Distribution of impact forces preferably prevents cap 110 and domed top 1019 from buckling inward and breaking or collapsing inward and breaking when struck (the above arrangement at least embodying herein at least one splaying resistor structured and arranged to resist splaying, due to such at least one longitudinally applied impact force, of such at least one cap sidewall).

Preferably, cap 1015 further comprises slit 1018 for passage of a drip irrigation line inserted into plant watering system.

FIG. 13 shows a perspective view of the cap of FIG. 12. Preferably, cap 1015 comprises reinforcing assembly 1103, as shown. Preferably, reinforcing assembly 1103 begins about a three-quarter inch distance from bottom end 1016 of cap 1015, as shown. Such distance permits cap 1015 to fit over first shaft 1020, a cylindrical tube, with a sufficient fit so that cap 1015 does not slip off when force is applied to cap 1015, as shown. Preferably, cap 1015 further comprises slit 1018 for passage of a drip irrigation line inserted into plant watering system. Reinforcing assembly 1103 preferably comprises preferably provides an adequate structural extension length, preferably one-half inch, to provide cap 1015 with strength and durability, preferably to withstand repetitive hammer blows applied to drive plant waterer 110 into an operative position below the soil surface 108, without compromising structural integrity of cap 1015 or plant waterer 110. Reinforcing assembly 1103 preferably extends from domed top 1019, preferably extends downwardly at least about one-half inch, preferably including the thickness of domed top 1019 (at least embodying herein wherein such at least one upper outer surface, such at least one upper inner surface, and such at least one first structural reinforcer of such at least one structurally reinforced cap comprise at least one combined thickness in excess of about one-half inch).

FIG. 14 shows a cross-sectional view of the section 14-14 of FIG. 12 illustrating the cap of the plant watering system of FIG. 10. Preferably, cap 1015 is reinforced with struts 1105, as shown. The preferred arrangement of cap 1015 provides added reinforcement so that, when plant watering system is pounded into the ground with, for example, a sledgehammer, the cap and the plant watering system will not crack or bend.

FIG. 15 shows a side view, in partial section, illustrating the reinforced spike of the plant watering system of FIG. 10. Preferably, spike 1030 is reinforced, as shown (at least embodying herein at least one soil-penetration assister comprises a spike). Preferably, sidewall 1300 of spike 1030 provides a reinforced spike so that the plant watering system may be driven into the ground without cracking or bending spike 1030.

FIG. 16 shows a plan view illustrating an alternate embodiment of a reinforced spike of the plant watering system of FIG. 10. Preferably, spike 1030 (at least embodying herein such spike comprises at least one second structural reinforcer structured and arranged to reinforce such spike, against structural failure of such spike, during such penetration of such at least one cylindrical tube through the soil; and such second structural reinforcer comprises at least six struts arranged around a central axis in equidistant arrangement) comprises struts 1400 radially extending from central axis 1415 of spike 1030, as shown. Preferably, six struts 1400 extend radially from central axis 1415, as shown. Preferably, the angle between each strut is about 60 degrees, as shown. Preferably, a space, shown as space 1420, resides between each strut 1400, as shown. Such an arrangement provides a sufficiently strong reinforced spike while balancing manufacturing considerations, such as drying time. FIG. 17 shows an exploded perspective view illustrating a plant watering system according to yet another preferred embodiment of the present invention. Preferably, plant waterer 110 comprises plant waterer 1700, as shown. Preferably, plant waterer 1700 comprises cap 1710, first shaft 1720 (a cylindrical tube) and second shaft 1725 (also a cylindrical tube), ending in spike 1790, as shown. Preferably, first shaft 1720 comprises a variety of lengths as described, for example, in FIGS. 5-7. Preferably, first shaft 1720 is constructed so that first shaft fits onto second shaft 1725, as shown. Preferably, second shaft 1725 comprises shelf 1735 and male portion 1737, as shown. Preferably, first shaft 1720 comprises female portion 1739, as shown. Preferably, male portion 1737 is inserted into female portion 1739 to assemble plant waterer 1700, as shown (see FIG. 18). As shown in FIG. 16, the bottom end of first shaft 1720 rests on shelf 1735. (The above arrangement at least embodying herein wherein such at least one cylindrical tube further comprises: at least one first tube segment comprising at least one first tube-segment length; at least one second tube segment comprising at least one second tube-segment length and at least one second segment sidewall; and at least one coupler structured and arranged to couple such at least one first tube segment with such at least one second tube segment; wherein such at least one first tube segment comprises such at least one bottom end portion; and wherein such at least one second tube segment comprises such at least one top end portion).

Preferably, first shaft 1720 comprises slit 1715, as shown. Preferably slit 1715 comprises distance A which extends a length about one and one-half inches down the side of first shaft 1720 beginning at the top of first shaft 1720, as shown. Preferably, first shaft 1720 comprises two slits 1715 on opposite sides of first shaft 1720. When cap 1710 is installed on first shaft 1720, adequate space for a drip irrigation line through slit 1715 is available, as shown in FIG. 18.

Preferably, first shaft 1720 comprises hole 1792, as shown. Holes 1792 are structured and arranged to receive at least one pulling tool, such as, for example, a metal rod, that can be used to pull the plant watering system up out of the ground. Preferably, hole 1792 is located a distance B from top of first shaft 1720, as show. Preferably, distance B is about two inches.

FIG. 18 shows a perspective view illustrating the plant watering system of FIG. 17 in an assembled configuration. In an assembled configuration, cap 1710 fits atop first shaft 1720, as shown. Preferably, slit 1715 for a drip irrigation line, is exposed when cap 1710 is installed, as shown.

FIG. 19 shows a plan view of the underside of a cap of the plant watering system of FIG. 17. Preferably, cap 1710 comprises reinforcing assembly 1706, as shown. Reinforcing assembly 1706 preferably comprises a plurality of struts 1711 extending radially from central axis 1713, preferably hollow, (central axis 1713 is the axis parallel to the outer edge of cap 1710), as shown. Preferably, cap 1710 comprises eight struts 1711 arranged around central axis 1713, as shown. Preferably, the angle between each strut 1711 is about 45 degrees, as shown. Preferably, between each strut 1711 is space 1716, as shown. Such an arrangement provides a sufficiently strong reinforced cap while balancing manufacturing considerations, such as drying time. Upon reading the teachings of this specification, those with ordinary skill in the art will now understand that, under appropriate circumstances, considering such issues as desired reinforcement, development of stronger materials, desired durability, etc., other reinforcement assembly arrangements, such as completely solid reinforcement, more than 8 reinforcing struts, other than radially arranged struts, etc., may suffice.

FIG. 20 shows a perspective view of the cap of FIG. 19. Preferably, cap 1710 comprises reinforcing assembly 1706, as shown. Preferably, reinforcing assembly 1706 begins about a three-quarter inch distance from bottom end 1709 of cap 1710, as shown. Such distance permits cap 1710 to fit over first shaft 1720 with a sufficient fit so that cap 1710 does not slip off when force is applied to cap 1710, as shown. Upon reading the teachings of this specification, those with ordinary skill in the art will now understand that, under appropriate circumstances, considering such issues as desired use, advances in material development, etc. other distances from bottom end, such as about one inch, about one-half inch, etc., may suffice.

FIG. 21 shows a cross-sectional view of the cap of the plant watering system of FIG. 17 through the section 21-21. As shown, cap 1710 comprises struts 1711, as shown. The preferred arrangement of cap 1710 provides added reinforcement so that, when plant watering system is pounded into the ground with, for example, a sledgehammer, the cap and the plant watering system will not crack or bend.

FIG. 22 shows a cross-sectional view of the section 22-22 illustrating the reinforced spike of the plant watering system of FIG. 17. Preferably, spike 1790 is reinforced, as shown. Preferably, sidewall 1780 of spike 1790 is solid, as shown, so that the plant watering system may be driven into the ground without cracking or bending spike 1790.

FIG. 23 shows a top plan view illustrating an alternate embodiment of the reinforced spike of the plant watering system of FIG. 17. Preferably, spike 1790 is reinforced with struts 1791 radially extending from central axis 1793 of spike, as shown. Preferably, six struts extend radially from central axis 1793, as shown. Preferably, the angle between each strut is about 60 degrees, as shown. Preferably, a space, shown as space 1796, is between each strut 1791, as shown. Such an arrangement provides a sufficiently strong reinforced spike while balancing manufacturing considerations, such as drying time.

FIG. 24 shows a partial perspective view illustrating a preferred perforation arrangement of a plant watering system according to a preferred embodiment of the present invention. Preferably, on opposite sides of the second shaft, an alternately preferred hole pattern, as shown, is used. Preferably, a central column of larger holes (relative to the smaller holes, as shown) is used, as shown. Preferably, each larger hole comprises a diameter F, as shown. Preferably, diameter F is about one-quarter inch. Preferably, around each larger hole, in an X-like configuration, are preferably four smaller holes (relative to larger holes, as shown). Preferably, each smaller hole comprises a diameter G, as shown. Preferably diameter G is about one-eighth inch. Preferably, the distance from the far end of a larger hole to the far end of a smaller hole is shown as distance H. Preferably, distance H comprises a distance of about three-quarter inch. Such an arrangement provides regularly spaced holes to allow for a pattern of fluid dispersion out of the second shaft.

FIG. 25 shows a perspective view illustrating the use of an herbicide with plant watering system 100 according to a preferred embodiment of the present invention. Preferably, an herbicide is incorporated into a piece of fabric, fabric 2500, which is placed within plant watering system 100, as shown. In addition to the watering of the roots, the growth of the roots may be controlled with fabric 2500 comprising an herbicide.

Preferably, fabric 2500 comprises a nonwoven, polypropylene geotextile fabric, preferably BioBarrier® manufactured by Reemay, Inc., of Old Hickory, Tenn. Preferably, fabric 2500 comprises at least one attached nodule 2503, as shown. Preferably, such attached nodules 2503 comprise an herbicide, preferably, the herbicide Trifluralin, sold as a liquid under the product name Treflan E.C. made available by Dow AgroSciences Canada Inc. of Calgary, Alberta. Trifluralin works by preventing root spike cells from dividing and does not affect the plant systemically. Trifluralin is preferred because it retains potency for years and typically does not require replacement. Trifluralin is also preferred because it is essentially nontoxic, having an EPA toxicity rating of class IV and an acute oral LD50 in rats greater than 10,000 mg/kg, which is slightly more toxic than sugar but less toxic than salt.

Trifluralin has an extremely low water solubility of 0.3 ppm, making it unlikely to leach into groundwater. Trifluralin also tightly attaches to soil, so it doesn't tend to migrate. Trifluralin decomposes in six months or less, so it doesn't persist in the ground.

Preferably, fabric 2500 comprising herbicide is rolled and inserted into the bottom of the second shaft adjacent internal filter 140. BioBarrier® comprising Trifluralin is also preferred because the attached nodules slowly release Trifluralin, creating a zone where root growth is inhibited. Further, BioBarrier® is porous to allow air, nutrients and water through it so that soil hydrology can continue to be healthy. BioBarrier® is also preferred because it is easy to install and will be effective at least 15 years or more depending on soil temperature and composition.

FIG. 26 shows a side view illustrating modular plant waterer 3000, in a preferred first configuration 3002, according to an alternate preferred embodiment of plant watering system 100. FIG. 27 shows a top view of the modular plant waterer 3000 according to the preferred embodiment of FIG. 26. FIG. 28 shows a sectional view, through the section 29-29 of FIG. 27, illustrating the preferred internal arrangements of modular plant waterer 3000. FIG. 29 shows an exploded view of a set of preferred components of modular plant waterer 3000.

Referring to FIG. 26 through FIG. 29, modular plant waterer 3000 preferably assists in the watering and fertilization of plants 102 (see FIG. 1) at the root zone 106, in addition to better aerating soil 104 with oxygen. Modular plant waterer 3000 is preferably designed to deep saturate soil 104 around plant 102, with an aqueous liquid 114, to promote deep root growth, rather than the horizontal surface root growth, which often occurs with conventional drip irrigation systems.

Modular plant waterer 3000 preferably comprises a multi-part hollow cylindrical tube 3010 comprising top end portion 3012, bottom end portion 3014, and an outer sidewall 3016, as shown. Sidewall 3016 preferably defines a hollow interior portion 3022, preferably extending along length L1 of the apparatus, as shown.

Pluralities of passages 3020 (at least embodying herein a plurality of passages, each one structured and arranged to pass the at least one aqueous liquid from within such at least one cylindrical tube through such at least one sidewall) are preferably located within sidewall 3016, as shown. Each passage 3020 is preferably structured and arranged to pass aqueous liquid 114 from within interior portion 3022 through sidewall 3016. To prevent non-liquid material from passing through passages 3020 at least one material excluder 3024 (at least embodying herein at least one material excluder structured and arranged to exclude non-liquid material from passing through such plurality of passages) is preferably applied to the inter surface of sidewall 3016 at the location of passages 3020, as shown. Material excluder 3024 preferably comprises the same liquid-permeable fabric 142 described in the prior embodiments of plant watering system 100. The application of material excluder 3024 throughout the shaft also prevents insects from crawling out of the passages 3020 and into deep soil surrounding the roots of the plant.

Modular plant waterer 3000 is preferably designed to work with a range of aqueous liquid sources 116, preferably including, garden hoses, alternately preferably flood irrigation, or alternately preferably, in conjunction with automatic landscape drip systems. Standard one-quarter inch drip irrigation lines readily connects to modular plant waterer 3000 by passing through slit 3018 formed in cap 3008, as shown (at least embodying herein wherein such at least one cap comprises at least one side slot structured and arranged to receive at least one liquid-carrying tube providing tube-assisted carrying of the at least one aqueous liquid from the at least one aqueous liquid source). Top end portion 3012 of cylindrical tube 3010 is preferably open under cap 3008 to allow the aqueous liquid 114 to flow directly into interior portion 3022.

As in the prior preferred embodiments of plant watering system 100, cap 3008 is preferably reinforced to prevent structural failure of the cap when modular plant waterer 3000 is driven into soil 104 by a hammer. Cap 3008 preferably comprises the reinforcing assembly 1103 described in FIG. 12 and FIG. 13 (at least embodying herein, at least one first structural reinforcer structured and arranged to reinforce such at least one cap, against structural failure of such at least one cap, during impact by a hammer used to effect such penetration of such at least one cylindrical tube through the soil). Thus, cap 3008 preferably acts as a protective cover when hammering the device to the ground, keeps rocks and leaves from entering cylindrical tube 3010, and preferably holds the irrigation drip line securely in place. In many parts of the U.S., cap 3008 also preferably protects the emitter head from squirrels or other animals.

Bottom end portion 3014 of cylindrical tube 3010 preferably comprises at least one soil-penetration assister 3026 structured and arranged to assist penetration of the apparatus embodiment through soil 104. Soil-penetration assister 3026 preferably comprises spike 3028 preferably tapering from bottom end portion 3014 to a closed conical point, as shown. Additionally, spike 3028 preferably comprises structural reinforcing 3030 structured and arranged to reinforce the spike against structural failure during movement through the soil. Spike 3028 preferably comprises struts 1400 radially extending from central axis 3015 of spike 3028, as shown. Preferably, six struts 1400 extend radially from central axis 3015, as similarly shown in the embodiment of FIG. 16. The preferred angle between each strut is about 60 degrees.

Cylindrical tube 3010 of modular plant waterer 3000 is preferably divided into a set of interchangeable tube segments designed to form modular plant waterers of differing lengths L1. Cylindrical tube 3010 is preferably divided into a first tube segment 3032 comprising bottom end portion 3014 and second tube segment 3034 comprising top end portion 3012, as shown. First tube segment 3032 preferably comprises first tube-segment length L2, as shown, and a second tube segment 3034 preferably comprises a second tube-segment length L3. First tube-segment length L2 preferably comprises a fixed length, preferably a fixed length of at least about 12 inches (at least embodying herein such at least one first tube-segment length comprises at least about 12 inches), most preferably a length of about 13 inches. Second tube-segment length L3 is preferably of variable length, thus allowing modular plant waterer 3000 of differing lengths to be developed. Such a plurality of second segment lengths assists a user in developing a preferred depth of penetration of cylindrical tube 3010 beneath the surface of soil 104 (the above arrangement at least embodying herein such at least one second tube-segment length comprises a plurality of segment lengths to assist user selecting of a penetration depth of such at least one cylindrical tube beneath the surface of such soil).

The multi-part cylindrical tube 3010 is preferably interconnected by a least one coupler 3036 structured and arranged to couple first tube segment 3032 with second tube segment 3034. Coupler 3036 preferably comprises a male fitting adapted to fit snuggly within the interior bore of the other tube, as shown. For durability, first tube segment 3032 and second tube segment 3034 are preferably joined using permanent means, preferably using a material-compatible bonding adhesive. Upon reading this specification, those with ordinary skill in the art will now appreciate that, under appropriate circumstances, considering such issues as cost, user preference, etc., other coupler arrangements such as, for example, threaded coupling, bayonet coupling, etc., may suffice.

In a preferred configuration 3021 of cylindrical tube 3010, second tube-segment length L3 preferably comprises about 11 inches; this length produces a preferred overall apparatus length L1 of about 24 inches (when second tube segment 3034 is joined with first tube segment 3032).

In second preferred configuration 3023 of cylindrical tube 3010, second tube-segment length L3 preferably comprises about 22 inches; this longer preferred length produces a preferred overall apparatus length L1 of about 36 inches (when second tube segment 3034 is joined with first tube segment 3032). The 24-inch unit is preferably used with average-sized trees, while the 36-inch unit is preferably designed for palm trees and deeper rooted trees.

Second tube segment preferably comprises an inner diameter of about one inch and a uniform sidewall thickness of about 5/32 inch. First tube segment 3032 preferably comprises a proximal end 3038 having an inner diameter of about one inch and a sidewall thickness of about 5/32 inch, and a distal end 3040 having an outer diameter of about one inch and a sidewall thickness of about 5/32 inch (the above arrangement at least embodying herein such at least one second tube segment comprises an inner diameter of about one inch and a sidewall thickness of about 5/32 inch; and such at least one first tube segment comprises a proximal end having an inner diameter of about one inch and a sidewall thickness of about 5/32 inch, and a distal end having an outer diameter of about one inch and a sidewall thickness of about 5/32 inch). Preferably, cap 3008 can be fitted to either the proximal end 3038 of first tube segment 3032 or top end portion 3012 of second tube segment 3034 (at least embodying herein such at least one first tube-segment and such at least one second-tube segment are structured and arranged to removably receive such at least one structurally reinforced cap).

The plurality of passages 3020 of cylindrical tube 3010 are preferably structured and arranged to disperse aqueous liquid 114 along substantially a full length L1 of modular plant waterer 3000 (extending between top end portion 3012 and bottom end portion 3014). First tube segment 3032 preferably comprises a regular pattern of apertures (passages 3020) preferably extending along first tube-segment length L2, as shown. Passages 3020 are preferably located on opposite sides of the first shaft, and preferably comprise a central column of larger holes (relative to the smaller holes), as shown. Preferably, each larger hole comprises a diameter of about 0.2 inches. Preferably, around each larger hole, in an X-like configuration, are preferably four smaller holes (relative to larger holes, as shown). Preferably, each smaller hole comprises a diameter of about 0.15 inches. Preferably, the center-to-center distance between large and small holes is about 0.6 inch. Passages 3020 (at least embodying herein such plurality of passages comprises extending along such at least one first tube-segment length, at least one regular pattern of apertures having an aggregate open area of at least about one quarter of one square inch) of first tube segment 3032 preferably comprise an aggregate open area of at least about one quarter of one square inch. Such an arrangement provides regularly spaced holes to allow for a pattern of fluid dispersion out of the lower portion of the first shaft.

Passages 3020 of second tube segment 3034 preferably comprise a linear pattern extending along second tube-segment length L3, as shown. Each aperture (passage 3020) comprises a diameter of about three-eighths inch and an aperture to aperture spacing S of about four inches (at least embodying herein such plurality of passages comprises extending along such at least one first tube-segment length, at least one regular pattern of apertures having an aggregate open area of at least about one quarter of one square inch).

Periodically, as a shrub or tree grows and roots extend farther away from the trunk, repositioning of modular plant waterer 3000 to a location beneath the outer edge of the leaf canopy is recommended. The uppermost aperture 3042 within the sidewall 3016 of second tube segment 3034 preferably functions as a tool-receiving aperture structured and arrange to receive at least one hand-grippable tool. This tool-receiving aperture 3042 (at least embodying herein such at least one second segment sidewall of such at least one second tube segment comprises at least one tool-receiving aperture structured and arrange to receive at least one hand-grippable tool; and such at least one tool-receiving aperture is structured and arranged to assist user removal of such at least one cylindrical tube, from the soil, using such at least one hand-grippable tool) is preferably structured and arranged to assist user removal of cylindrical tube 3010, from soil 104, using such hand-grippable tool, such as, for example, a screwdriver. A user inserts a screwdriver or like tool through the apertures and pulls upward to release the apparatus from the soil. A Slight twisting of the tube assists removal. Aperture 3042 preferably remains without a covering of fabric 142, to permit passage of the tool through the tube. Applicant has found that rotation of cylindrical tube 3010 about every six months keeps small roots from entering through passages 3020.

FIG. 30 shows a side view, in partial section, illustrating the installation of modular plant waterer 3000, comprising alternate preferred configuration 3004, according to another preferred embodiment of plant watering system 100. In this alternate preferred configuration, cylindrical tube 3010 comprises only first tube segment 3032, as shown. Cap 3008 is preferably coupled with proximal end 3038 of first tube segment 3032, as shown. In this preferred arrangement, the uppermost aperture 3044 of first tube segment 3032 preferably functions as the tool-receiving aperture. Aperture 3044 preferably remains without a covering of fabric 142, to permit passage of the tool through the tube. The over length of second configuration 3004 is preferably about 14 inches including cap 3008.

There are two preferred methods used to install modular plant waterer 3000. The first preferred method comprises inserting the units during new planting. The second preferred method comprises driving the unit into soil 104 using hammer 112, as shown. Preferably, a spot is chosen, free from underground lines and pipes, approximately half way between the base of the plant and outer edge of the leaf canopy. Newer trees preferably utilize about 2 to 3 units on opposing sides or surrounding the base of the tree. Older, more established trees may preferably utilize 5 to 6 modular plant waterers 3000. It is noted that, in some preferred installations, granulated tree fertilizer may be place within interior portion 3022 to slowly dissolve nutrients as aqueous liquid 114 passes through the tube, thus feeding the tree at the roots.

The components of modular plant waterer 3000 are preferably constructed of rigid Acrylonitrile Butadiene Styrene (ABS) plastic. Cap 3008 is preferably protected from Ultraviolet-caused degradation through the addition of UV stabilizers. Upon reading this specification, those with ordinary skill in the art will now appreciate that, under appropriate circumstances, considering such issues as cost, intended use, etc., other material arrangements such as, for example, PVC, fiberglass, metal, etc., may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A plant watering system, relating to dispersing at least one aqueous liquid, from at least one aqueous liquid source, into soil comprising a root zone of a plant situate beneath a surface of the soil, said plant watering system comprising:
   a) at least one cylindrical tube structured and arranged to permit the flow of the at least one aqueous liquid from the at least one aqueous liquid source to the root zone of the plant comprising
      i) at least one top end portion,
      ii) at least one bottom end portion, and
      iii) at least one sidewall extending therebetween;
   b) located within said at least one sidewall
      i) a plurality of passages, each one structured and arranged to pass the at least one aqueous liquid from within said at least one cylindrical tube through said at least one sidewall, and
      ii) at least one material excluder structured and arranged to exclude non-liquid material from passing through said plurality of passages; and
   c) wherein said at least one top end portion is structured and arranged to receive the at least one aqueous liquid from the at least one aqueous liquid source into said at least one cylindrical tube;
   d) wherein said plurality of passages are structured and arranged to disperse the at least one aqueous liquid along substantially a full length of said at least one cylindrical tube extending between said at least one top end portion and said at least one bottom end portion; and
   e) wherein said at least one bottom end portion comprises at least one soil-penetration assister structured and arranged to assist penetration of said at least one cylindrical tube through the soil; and
   f) at least one structurally reinforced cap structured and arranged to cap said at least one cylindrical tube;
   g) wherein said at least one structurally reinforced cap comprising
      i) at least one upper outer surface,
      ii) at least one upper inner surface, and
      iii) at least one first structural reinforcer structured and arranged to reinforce said at least one structurally reinforced cap against structural failure during at least one longitudinally applied impact force sufficient to effectuate penetration into the soil;
   h) wherein said at least one first structural reinforce comprises at least one domed-shaped force distributor structured and arranged to distribute at least one longitudinally applied impact force, applied to said at least one upper outer surface, to at least one cap sidewall; and
   i) wherein, when said at least one structurally reinforced cap is coupled onto said at least one cylindrical tube, said at least one domed-shaped force distributor assists force distribution of such at least one longitudinally applied impact force to said at least one top end portion and to said at least one sidewall of said at least one cylindrical tube to effectuate penetration of said at least one cylindrical tube through the soil.

2. The plant watering system according to claim 1 wherein said at least one upper outer surface, said at least one upper inner surface, and said at least one first structural reinforcer of said at least one structurally reinforced cap comprise at least one combined thickness in excess of about one-half inch.

3. The plant watering system according to claim 1 wherein said at least one first structural reinforcer comprises at least one structural web framework.

4. The plant watering system according to claim 3 wherein said at least one at least one structural web framework comprises at least eight struts arranged around a central axis in equidistant arrangement.

5. The plant watering system according to claim 1 wherein said at least one structurally reinforced cap comprises ultra-violet (UV) stabilizers structured and arranged to resist material decomposition due to ultra-violet radiation.

6. The plant watering system according to claim 1 wherein:
   a) said at least one domed-shaped force distributor comprises a domed-shaped top about one and three-quarter inch in height, and one and one-half inch in outer diameter; and
   b) said at least one structural web framework extends downwardly about one-inch from said at least one upper inner surface of said at least one structurally reinforced cap.

7. The plant watering system according to claim 1 wherein at least one soil-penetration assister comprises a spike.

8. The plant watering system according to claim 7 wherein said spike comprises at least one second structural reinforcer structured and arranged to reinforce said spike, against structural failure of said spike, during such penetration of said at least one cylindrical tube through the soil.

9. The plant watering system according to claim 8 wherein said second structural reinforcer comprises at least six struts arranged around a central axis in equidistant arrangement.

10. The plant watering system according to claim 1 wherein said at least one material excluder comprises at least one liquid-permeable fabric overlaying and situate adjacent an inner-wall surface of said at least one sidewall.

11. The plant watering system according to claim 1 wherein said at least one structurally reinforced cap comprises at least one side slot structured and arranged to receive at least one liquid-carrying tube providing tube-assisted carrying of the at least one aqueous liquid from the at least one aqueous liquid source.

12. The plant watering system according to claim 1 wherein said at least one cylindrical tube further comprises:
   a) at least one first tube segment comprising at least one first tube-segment length;
   b) at least one second tube segment comprising at least one second tube-segment length and at least one second segment sidewall; and
   c) at least one coupler structured and arranged to couple said at least one first tube segment with said at least one second tube segment;
   d) wherein said at least one first tube segment comprises said at least one bottom end portion; and
   e) wherein said at least one second tube segment comprises said at least one top end portion.

13. The plant watering system according to claim 12 wherein said at least one first tube-segment length comprises at least about 12 inches.

14. The plant watering system according to claim 12 wherein said at least one second tube-segment length comprises a plurality of segment lengths to assist user selecting of a penetration depth of said at least one cylindrical tube beneath the surface of such soil.

15. The plant watering system according to claim 12 wherein both said at least one first tube-segment and said at least one second-tube segment are structured and arranged to removably receive said at least one structurally reinforced cap.

16. The plant watering system according to claim 12 wherein said plurality of passages comprises:
    a) extending along said at least one first tube-segment length, at least one regular pattern of apertures having an aggregate open area of at least about one quarter of one square inch,
    b) extending along said at least one second tube-segment length, at least one linear pattern of apertures each one comprising a diameter of about three-eighths inch and an aperture to aperture spacing of about four inches.

17. The plant watering system according to claim 12 wherein:
    a) said at least one second segment sidewall of said at least one second tube segment comprises at least one tool-receiving aperture structured and arrange to receive at least one hand-grippable tool; and
    b) said at least one tool-receiving aperture is structured and arranged to assist user removal of said at least one cylindrical tube, from the soil, using such at least one hand-grippable tool.

18. The plant watering system according to claim 12 wherein:
    a) said at least one second tube segment comprises an inner diameter of about one inch and a sidewall thickness of about 5/32 inch; and
    b) said at least one first tube segment comprises
        i) a proximal end having an inner diameter of about one inch and a sidewall thickness of about 5/32 inch, and
        ii) a distal end having an outer diameter of about one inch and a sidewall thickness of about 5/32 inch.

19. A plant watering system, relating to dispersing at least one aqueous liquid, from at least one aqueous liquid source, into soil comprising a root zone of a plant situate beneath a surface of the soil, said plant watering system comprising:
    a) at least one cylindrical tube structured and arranged to permit the flow of the at least one aqueous liquid from the at least one aqueous liquid source to the root zone of the plant comprising
        i) at least one top end portion,
        ii) at least one bottom end portion, and
        iii) at least one sidewall extending therebetween;
    b) located within said at least one sidewall
        i) a plurality of passages, each one structured and arranged to pass the at least one aqueous liquid from within said at least one cylindrical tube through said at least one sidewall, and
        ii) at least one material excluder structured and arranged to exclude non-liquid material from passing through said plurality of passages;
    c) wherein said at least one top end portion is structured and arranged to receive the at least one aqueous liquid from the at least one aqueous liquid source into said at least one cylindrical tube; and
    d) wherein said plurality of passages are structured and arranged to disperse the at least one aqueous liquid along substantially a full length of said at least one cylindrical tube extending between said at least one top end portion and said at least one bottom end portion;
    e) wherein said at least one bottom end portion comprises at least one soil-penetration assister structured and arranged to assist penetration of said at least one cylindrical tube through the soil; and
    f) at least one structurally reinforced cap structured and arranged to cap said at least one cylindrical tube;
    g) wherein said at least one structurally reinforced cap comprises at least one structural reinforcer structured and arranged to reinforce said at least one structurally reinforced cap against structural failure during at least one longitudinally applied impact force sufficient to effectuate penetration into the soil;
    h) wherein said at least one structural reinforcer comprises
        i) at least one force distributor structured and arranged to distribute such at least one longitudinally applied impact force, applied to said at least one structurally reinforced cap, to at least one cap sidewall,
        ii) at least one splaying resistor structured and arranged to resist splaying, due to such at least one longitudinally applied impact force, of said at least one cap sidewall, and
    i) wherein said at least one structurally reinforced cap comprises at least one force transferor structured and arranged to transfer such at least one downwardly applied impact force to said at least one top end portion and to said at least one sidewall of said at least one cylindrical tube, when said at least one structurally reinforced cap is coupled onto said at least one cylindrical tube.

20. The plant watering system according to claim 19 wherein said at least one structurally reinforced cap comprises at least one side slot structured and arranged to receive at least one liquid-carrying tube providing tube-assisted carrying of the at least one aqueous liquid from the at least one aqueous liquid source.

* * * * *